US011982617B2

(12) United States Patent
Hirata et al.

(10) Patent No.: US 11,982,617 B2
(45) Date of Patent: May 14, 2024

(54) OBSERVATION APPARATUS, OPTICAL DEFLECTION UNIT, AND IMAGE FORMATION METHOD

(71) Applicant: EVIDENT CORPORATION, Nagano (JP)

(72) Inventors: Tadashi Hirata, Tokyo (JP); Takashi Miyoshi, Tokyo (JP)

(73) Assignee: Evident Corporation, Nagano (JP)

( * ) Notice: Subject to any disclaimer, the term of this patent is extended or adjusted under 35 U.S.C. 154(b) by 332 days.

(21) Appl. No.: 17/378,890

(22) Filed: Jul. 19, 2021

(65) Prior Publication Data

US 2022/0026358 A1 Jan. 27, 2022

(30) Foreign Application Priority Data

Jul. 27, 2020 (JP) ................................. 2020-126562
Mar. 16, 2021 (JP) ................................. 2021-042156

(51) Int. Cl.
*G01N 21/41* (2006.01)
*G02B 19/00* (2006.01)
(Continued)

(52) U.S. Cl.
CPC ..... *G01N 21/4133* (2013.01); *G02B 19/0047* (2013.01); *G02B 19/0076* (2013.01);
(Continued)

(58) Field of Classification Search
CPC ....... G01N 21/4133; G01N 2021/1765; G01N 2021/4153; G02B 19/0047;
(Continued)

(56) References Cited

U.S. PATENT DOCUMENTS

2010/0188740 A1* 7/2010 Backhaus .............. A61B 90/20
359/376
2011/0140148 A1* 6/2011 Liu .................... G02B 19/0061
257/E33.059

(Continued)

FOREIGN PATENT DOCUMENTS

JP 6514832 B2 5/2019

OTHER PUBLICATIONS

Chinese Office Action dated Jan. 31, 2024 received in 202110746403.0.

*Primary Examiner* — Christopher Stanford
*Assistant Examiner* — Journey F Sumlar
(74) *Attorney, Agent, or Firm* — Scully, Scott, Murphy & Presser, P.C.

(57) ABSTRACT

An observation apparatus includes a case having a transmissive window, an image sensor, an optical system, and a light source housed in the case, and an optical deflection unit. The optical system is configured to condense light incident inside the case to form an image of a sample inside a container. The light source is configured to emit light to the outside of the case without passing through the optical system. The optical deflection unit is configured to deflect light emitted to the outside of the case from the light source to a first direction proceeding toward the transmissive window. An angle of exit between the first direction and an optical axis of the optical system is different from an angle of incidence between a second direction in which light emitted to the outside of the case is incident on the optical deflection unit, and the optical axis.

19 Claims, 23 Drawing Sheets

(51) Int. Cl.
*A61G 11/00* (2006.01)
*G01N 21/17* (2006.01)

(52) U.S. Cl.
CPC ...... *A61G 11/00* (2013.01); *G01N 2021/1765* (2013.01); *G01N 2021/4153* (2013.01)

(58) Field of Classification Search
CPC ............ G02B 19/0052; G02B 19/0057; G02B 19/0061; G02B 19/0076; G02B 19/0085
See application file for complete search history.

(56) References Cited

U.S. PATENT DOCUMENTS

| | | |
|---|---|---|
| 2019/0187450 A1 | 6/2019 | Hirata |
| 2019/0219808 A1* | 7/2019 | Takahashi ................ C12M 1/34 |
| 2020/0064610 A1* | 2/2020 | Echigo ................... G02B 21/36 |
| 2022/0137285 A1* | 5/2022 | Kim .................... G02B 6/0055 |
| | | 362/612 |

* cited by examiner

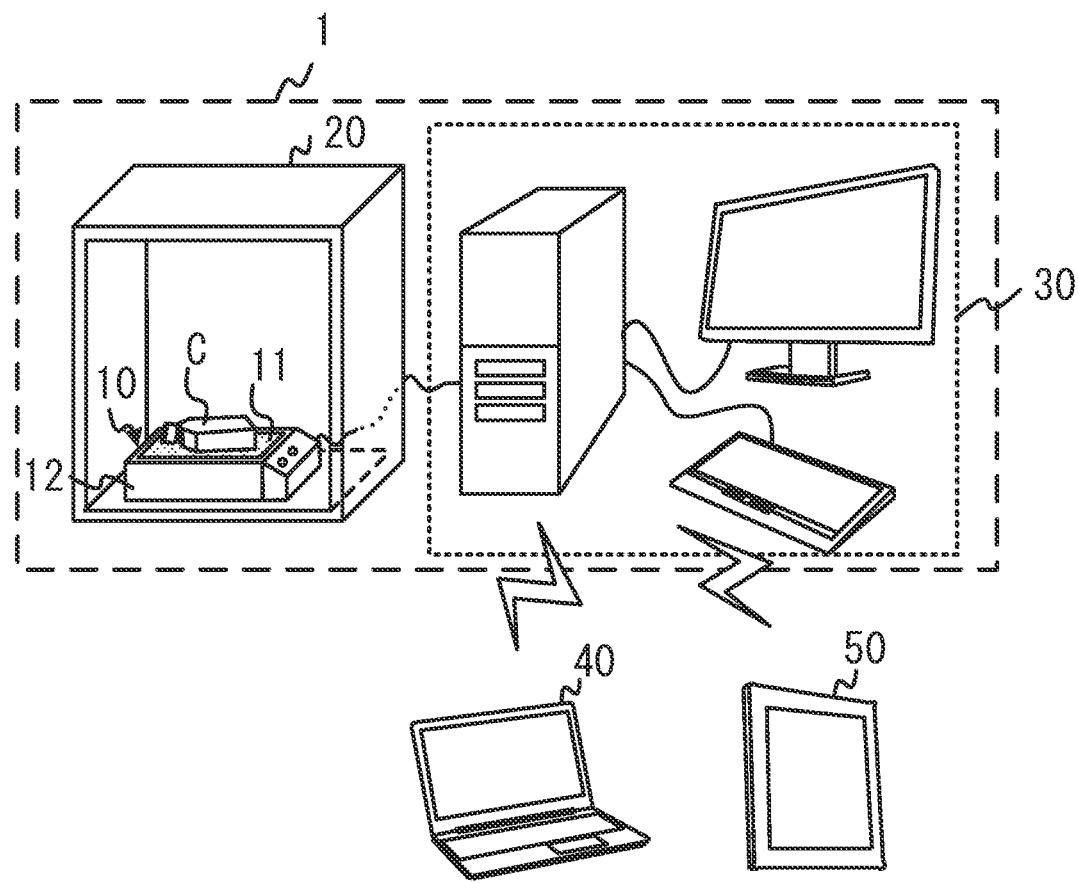
F I G. 1

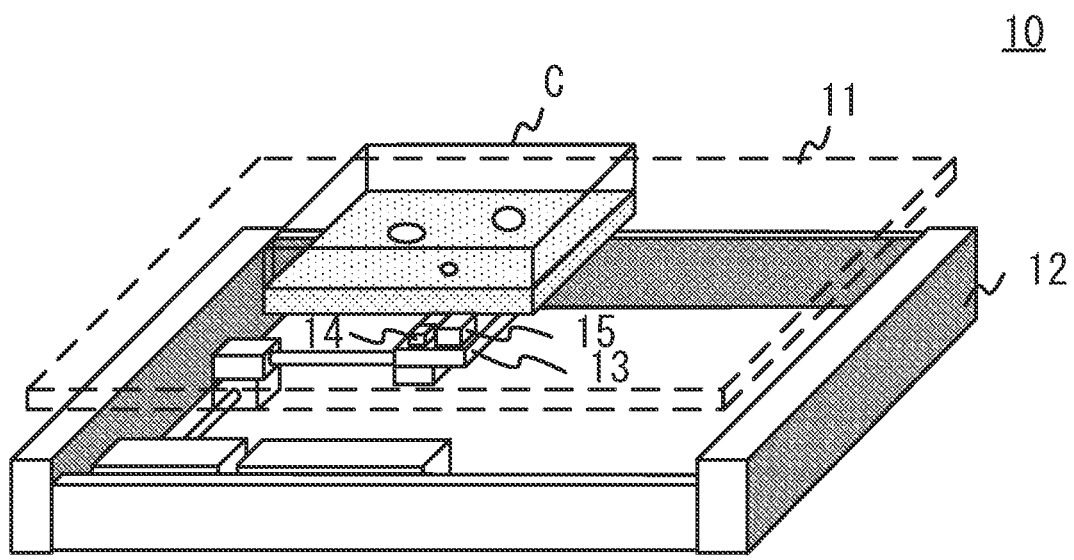
F I G. 2

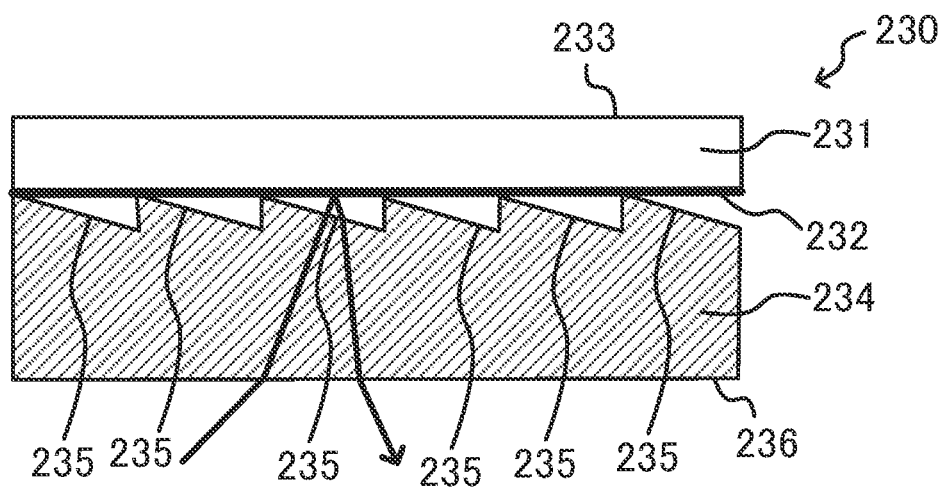
F I G. 2 1

OBSERVATION APPARATUS, OPTICAL DEFLECTION UNIT, AND IMAGE FORMATION METHOD

CROSS REFERENCE TO RELATED APPLICATIONS

This application is based upon and claims the benefit of priority from prior Japanese Patent Applications No. 2020-126562, filed Jul. 27, 2020 and No. 2021-42156, filed Mar. 16, 2021, the entire contents of which are incorporated herein by this reference.

BACKGROUND OF THE INVENTION

Field of the Invention

The disclosure of the present invention relates to an observation apparatus, an optical deflection unit, and an image formation method.

Description of the Related Art

Biological samples such as cells are cultivated in incubators in order to maintain the culture environment. During cultivation, the state of a biological sample is checked periodically, but if the biological sample is taken out of the incubator every time the checking work is performed, there are concerns about adversely influencing the growth of the biological sample.

Technology related to such issues is described in U.S. Patent Application Publication No. 2019/0187450, for example. By using the observation apparatus adopting oblique illumination described in U.S. Patent Application Publication No. 2019/0187450, samples such as cells can be observed without increasing the size of the apparatus. Consequently, it is possible to continually observe a biological sample in culture in a limited space inside an incubator, without taking the biological sample in culture out of the incubator.

SUMMARY OF THE INVENTION

An observation apparatus according to an aspect of the present invention is provided with: a case including a transmissive window; an image sensor housed in the case; an optical system housed in the case, the optical system being configured to condense light incident inside the case by transmitting through the transmissive window to form an image of a sample inside a container placed on the transmissive window above the image sensor; a light source housed in the case, the light source being configured to emit light to an outside of the case without passing through the optical system; and an optical deflection unit configured to deflect light emitted from the light source to an outside of the case in a first direction going toward the transmissive window, such that an angle of exit defined as the angle between the first direction and an optical axis of the optical system is different from an angle of incidence defined as the angle between a second direction in which light emitted to the outside of the case is incident on the optical deflection unit, and the optical axis.

An optical deflection unit according to another aspect of the present invention is the optical deflection unit described in the above aspect.

An image formation method according to another aspect of the present invention includes: emitting light from an inside of a case to an outside of the case; deflecting, with an optical deflection unit, the light emitted to the outside of the case to a first direction proceeding toward a transmissive window of the case; and condensing, with an optical system inside the case, light incident inside the case by transmitting through the transmissive window to form an image of a sample inside a container placed on the transmissive window above an image sensor, wherein an angle of exit defined as the angle between the first direction and an optical axis of the optical system is different from an angle of incidence defined as the angle between a second direction in which light emitted to the outside of the case is incident on the optical deflection unit, and the optical axis.

BRIEF DESCRIPTION OF THE DRAWINGS

FIG. 1 is a diagram illustrating an example of a configuration of a system 1 according to a first embodiment;

FIG. 2 is a diagram illustrating an example of a configuration of an observation apparatus 10 according to the first embodiment;

FIG. 21 is a diagram for explaining yet another example of the configuration of the optical deflection unit;

DETAILED DESCRIPTION OF THE PREFERRED EMBODIMENTS

Figure 3:
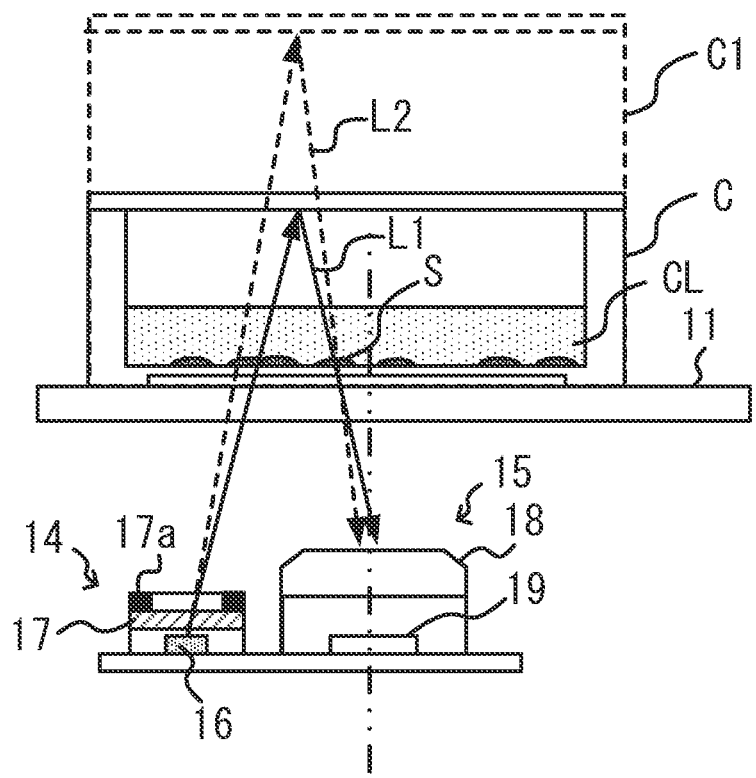
FIG. 3 is diagram for explaining the relationship between the height of a culture container and a pencil of light.

In U.S. Patent Application Publication No. 2019/0187450, a condition for achieving both a compact apparatus and high contrast is described. By satisfying the condition described in U.S. Patent Application Publication No. 2019/0187450, a sample can be observed stereoscopically with high contrast. However, because the condition includes the height of the reflective surface that is constrained by the container housing the sample, the containers capable of satisfying the condition may be limited.

Hereinafter, embodiments of the present invention will be described in consideration of circumstances like the above.

First Embodiment

FIG. 1 is a diagram illustrating an example of a configuration of a system 1 according to the present embodiment. The system 1 illustrated in FIG. 1 is an observation system used to observe a sample housed in a culture container C. The system 1 is provided with an observation apparatus 10 that acquires an image of a sample being cultivated inside the culture container C, and a control apparatus 30 that controls the observation apparatus 10.

To observe a sample without taking the sample out of an incubator 20, the observation apparatus 10 is used by being placed inside the incubator 20, as illustrated in FIG. 1, for example. More specifically, the observation apparatus 10 is disposed inside the incubator 20 in a state with the culture container C placed on a transmissive window 11 of the observation apparatus 10, and acquires an image of the sample inside the culture container C according to an instruction from the control apparatus 30. Note that the transmissive window 11 is a transparent top panel that forms the upper face of a case 12 of the observation apparatus 10, and contains a material such as glass or a transparent resin, for example.

The control apparatus 30 transmits an image acquisition instruction to the observation apparatus 10 placed inside the incubator 20, and receives an image acquired by the observation apparatus 10. The control apparatus 30 may also display an image acquired by the observation apparatus 10 on a display device provided in the control apparatus 30. The control apparatus 30 may also communicate with a client terminal (client terminal 40, client terminal 50), and display an image acquired by the observation apparatus 10 on a display device provided in the client terminal. Note that the control apparatus 30 sufficiently includes one or more processors and one or more non-transitory computer readable media, and may be a general computer or a special-purpose apparatus.

FIG. 1 illustrates an example in which the observation apparatus 10 and the control apparatus 30 are connected in a wired manner. However, it is sufficient for the observation apparatus 10 and the control apparatus 30 to be able to exchange data. Consequently, the connection between the observation apparatus 10 and the control apparatus 30 is not limited to a wired connection and may also be a wireless connection.

Figure 4:
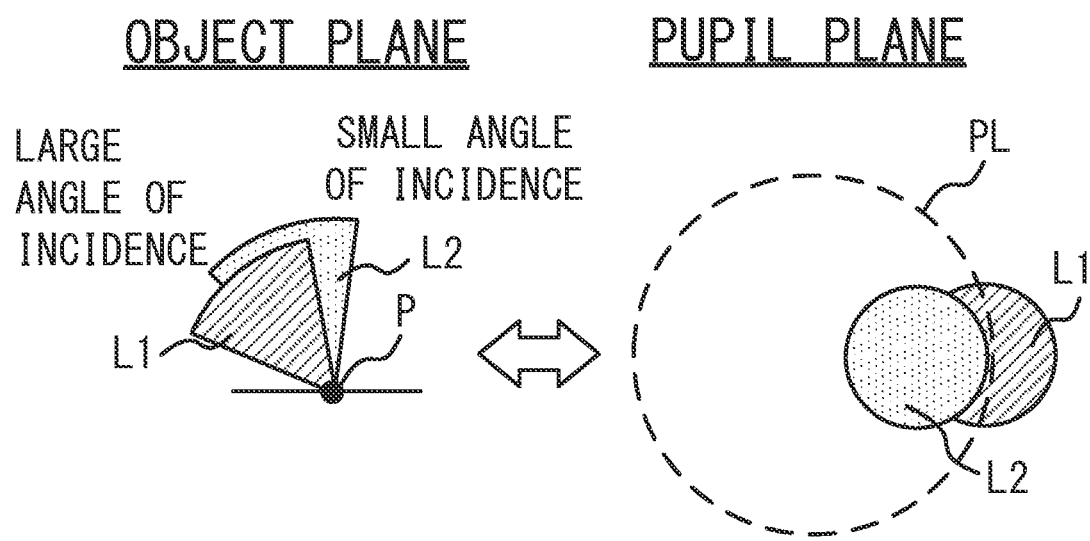
FIG. 4 is a diagram for explaining the relationship between the angle of incidence of a pencil of light on a sample and the distribution of the pencil of light on the pupil plane.

FIG. 2 is a diagram illustrating an example of a configuration of the observation apparatus 10 according to the present embodiment. FIG. 3 is diagram for explaining the relationship between the height of a culture container and a pencil of light. FIG. 4 is a diagram for explaining the relationship between the angle of incidence of a pencil of light on a sample and the distribution of the pencil of light on the pupil plane. Hereinafter, the configuration and action of the observation apparatus 10 will be described with reference to FIGS. 2 to 4.

The observation apparatus 10 is provided with a box-shaped case 12, the top face of which is the transmissive window 11 on which the culture container C is disposed. The culture container C contains a sample S and a culture liquid CL. Additionally, the observation apparatus 10 is provided with a light source unit 14 that illuminates the sample and an imaging unit 15 that acquires an image of the sample, both of which are housed inside the case 12. The light source unit 14 and the imaging unit 15 are installed on a stage 13, and move with respect to the culture container C due to the stage 13 moving inside the case 12. With this arrangement, the observation apparatus 10 can illuminate a sample existing at any position inside the culture container C with the light source unit 14, and acquire an image of the sample with the imaging unit 15.

Note that FIG. 2 illustrates an example in which the light source unit 14 and the imaging unit 15 are installed on the stage 13, and move as one inside the case 12 as a result. However, the light source unit 14 and the imaging unit 15 may also move independently of each other inside the case 12.

As illustrated in FIG. 3, the light source unit 14 is provided with a light source 16 and a diffusion plate 17. The light source 16 includes a light-emitting diode (LED), for example. The light source 16 may include a white LED, and may also include a plurality of LEDs that emit light at multiple different wavelengths, such as red (R), green (G), and blue (B). Light emitted from the light source 16 is incident on the diffusion plate 17. The configuration of the light source 16 is not particularly limited, but if an LED is adopted, a longer lifespan and lower costs can be achieved compared to a typical halogen lamp or the like.

The diffusion plate 17 diffuses light emitted from the light source 16. The diffusion plate 17 is not particularly limited, and may be a frosted diffusion plate having asperities formed on the surface. However, the diffusion plate 17 may also be an opal diffusion plate with a coated surface, or some other type of diffusion plate. Furthermore, a mask 17a for restricting the emission region of diffuse light may also be formed in the diffusion plate 17. Light emitted from the diffusion plate 17 advances in various directions.

As illustrated in FIG. 3, the imaging unit 15 is provided with an optical system 18 and an imaging element 19. The optical system 18 condenses light incident inside the case 12 by transmitting through the sample S and the transmissive window 11. The optical system 18 is not particularly limited, and may be a finite-corrected objective lens that forms an image at a finite distance, for example. However, the optical system 18 may also include an infinity-corrected objective lens, and it is sufficient for the optical system 18 as a whole to form a finite-corrected optical system. By having the optical system 18, whose focal point is aligned with the inner bottom of the culture container C where the sample S exists, condense light incident inside the case 12 onto the imaging element 19, an optical image of the sample S is formed on the imaging element 19.

The imaging element 19 is an optical sensor that converts detected light into an electrical signal. Specifically, the imaging element 19 is an image sensor and is not particularly limited, but may be a charge-coupled device (CCD) image sensor or a complementary MOS (CMOS) image sensor, for example.

In the observation apparatus 10 configured as above, oblique illumination is adopted to visualize the sample S inside the culture container C that acts as a phase object. Specifically, as illustrated in FIG. 3, light produced by the light source 16 is diffused by the diffusion plate 17, and is emitted to the outside of the case 12 without going through the optical system 18. In other words, the light source unit 14 emits light that travels in various directions toward the outside of the case 12, without going through the optical system 18. Thereafter, a portion of the light emitted to the outside of the case 12 is deflected above the sample S by reflecting off the top face of the culture container C or the like, and furthermore, a portion of the light deflected above the sample S is irradiated onto the sample S and incident inside the case 12 by transmitting through the sample S and the transmissive window 11, for example. Additionally, a portion of the light incident inside the case 12 is condensed by the optical system 18 to form an image of the sample on the imaging element 19. In other words, to form an image on the imaging element 19 of the sample S inside the culture container C placed on the transmissive window 11, the optical system 18 condenses light that is incident inside the case 12 by transmitting through the transmissive window 11. Finally, the observation apparatus 10 generates an image of the sample S on the basis of an electrical signal outputted from the imaging element 19, and outputs the generated image to the control apparatus 30.

In order to visualize the sample S treated as the phase object by oblique illumination with high contrast to make cells and the like recognizable, it is important to form an image of the sample S by condensing rays of light incident on the sample S at an appropriate angle. In the observation apparatus 10, the light diffused by the diffusion plate 17 and advancing in various directions is deflected above the sample S and incident on the optical system 18 from various angles, but the angle distribution of the light incident on the optical system 18 depends on the height of the deflection plane, such as the height of the top face of the culture container. More specifically, as the height of the top face of the culture container that acts as the deflection plane increases, more of the light has a small angle of incidence.

For example, suppose that an image of the sample S is formed by using light reflected by the top face of the culture container. In this case, as illustrated in FIGS. 3 and 4, if a pencil of light L1 that passes through a point P on the sample S in the case of using a culture container C with a standard height (such as 60 mm, for example) is compared to a pencil of light L2 that passes through the point P on the sample S in the case of using a culture container C1 with a taller height than the culture container C, the pencil of light L2 is distributed over a smaller angle of incidence than the pencil of light L1 in the object plane.

The angle of incidence with respect to the object plane is converted by the optical system 18 to the distance from the optical axis in the pupil plane of the optical system 18. Consequently, the pencil of light L1 having an angle of incidence distributed over a relatively large angle in the object plane passes through a position relatively distant from the optical axis in the pupil plane. As a result, as illustrated in FIG. 4, the pencil of light L1 is distributed straddling the outer edge of the pupil PL of the optical system 18 in the pupil plane. Rays of light incident on the outside of the pupil PL from among the pencil of light L1 are vignetted inside the optical system 18, and do not reach the imaging element 19.

Consequently, the pencil of light that reaches the imaging element 19 from among the pencil of light L1 has an intensity distribution that is discontinuous in the angular direction, or in other words, a sudden change occurs in the intensity distribution. For this reason, in the case of using the culture container C, shadows are produced in the image of the sample S, and a stereoscopic image with high contrast can be obtained.

On the other hand, the pencil of light L2 having an angle of incidence distributed over a relatively small angle in the object plane passes through a position relatively close to the optical axis in the pupil plane. Consequently, as illustrated in FIG. 4, the entire pencil of light L2 passes through the inside of the pupil PL in the pupil plane and reaches the imaging element 19. The intensity distribution of the pencil of light L2 changes continuously in the angular direction, and therefore a sudden change in the intensity distribution in the angular direction does not occur in the pencil of light that reaches the imaging element 19. As a result, in the case of using the culture container C1, sufficient shadows are not as easily produced in the image of the sample S compared to the case of using the culture container C, and consequently, obtaining an image with high contrast is difficult.

In this way, if the sample S is visualized by relying on light reflected by the top face of the culture container, the contrast will change depending on the height of the culture container, and the observation performance of the observation apparatus 10 may not be exhibited fully in some cases. A conceivable countermeasure for addressing this problem is to increase the angle of incidence by increasing the distance between the light source unit 14 and the imaging unit 15. However, such a countermeasure causes the observation apparatus 10 (particularly the case 12) to be bulkier, and is not a desirable solution for an apparatus expected to be used in a limited space such as the incubator 20. Accordingly, the observation apparatus 10 according to the present embodiment solves such a technical problem by providing an optical deflection unit, and achieves high observation performance without making the observation apparatus 10 bulkier, and also regardless of the culture container.

Figure 5:
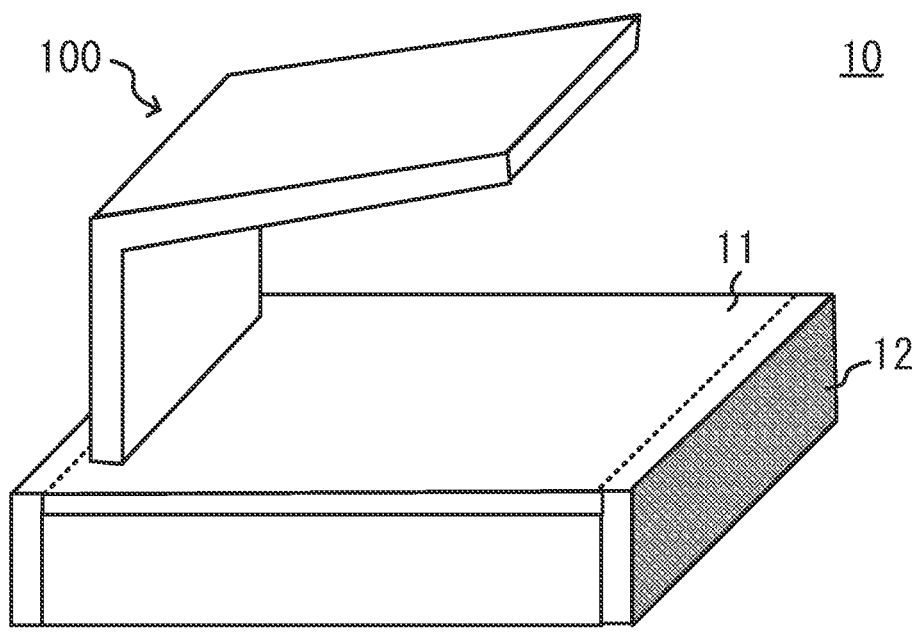
FIG. 5 is a view of the exterior of the observation apparatus 10 to which an optical deflection unit is attached.
Figure 6:
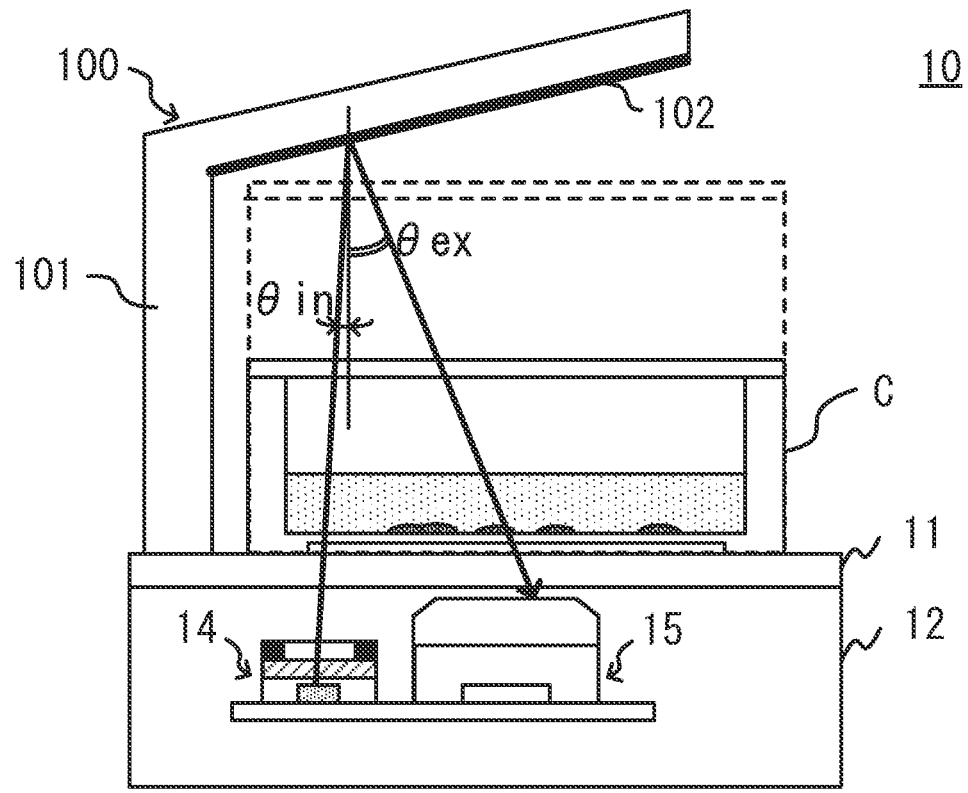
FIG. 6 is a diagram for explaining an example of the configuration of the optical deflection unit.
Figure 7:
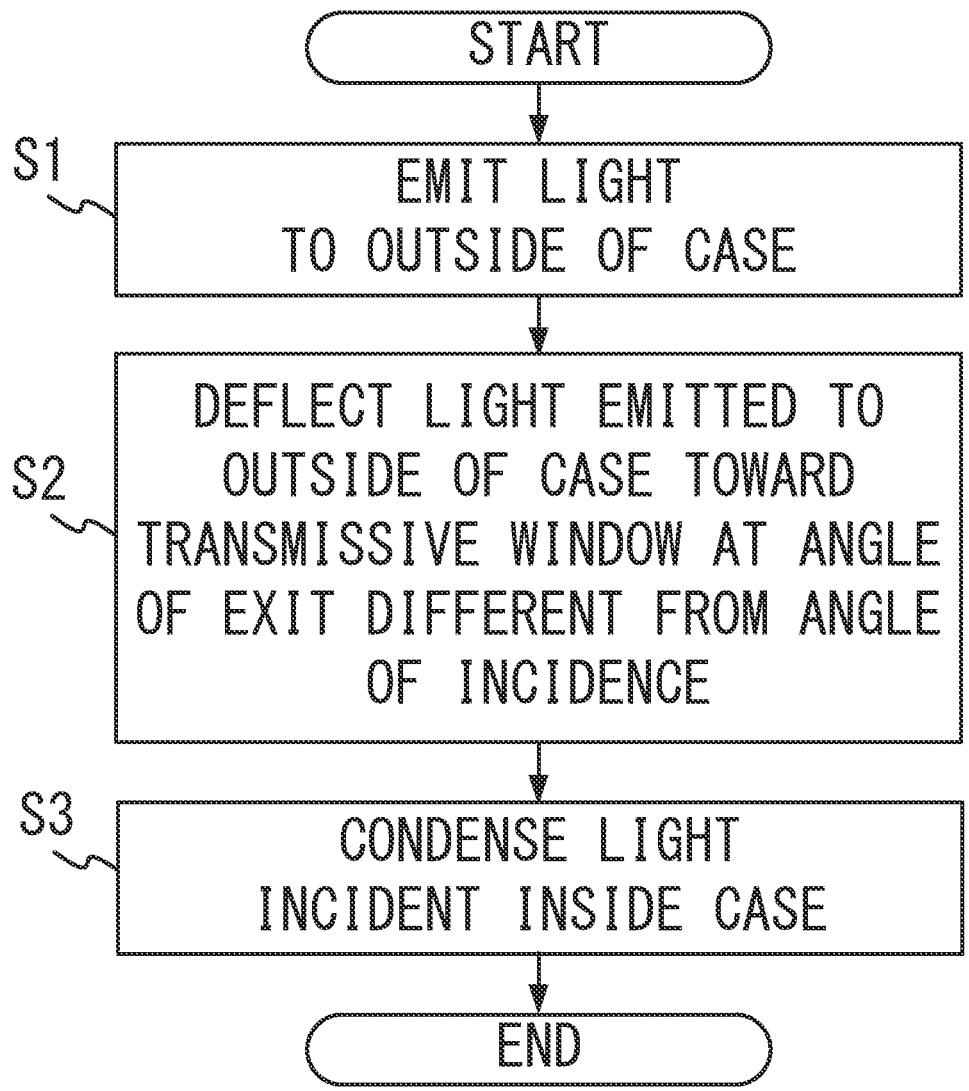
FIG. 7 is a flowchart for explaining an example of an image formation method performed by the observation apparatus 10.

FIG. 5 is a view of the exterior of the observation apparatus 10 to which an optical deflection unit is attached. FIG. 6 is a diagram for explaining an example of the configuration of the optical deflection unit. FIG. 7 is a flowchart for explaining an example of an image formation method performed by the observation apparatus 10. Hereinafter, FIGS. 5 to 7 will be referenced to describe the observation apparatus 10 and the image formation method performed by the observation apparatus 10, with focus on an optical deflection unit 100.

The optical deflection unit 100 is a detachable unit that is attached to the observation apparatus 10, for example. FIGS. 5 and 6 illustrate an example in which the optical deflection unit 100 is installed on the transmissive window 11 of the case 12, but the position where the optical deflection unit 100 is installed is not limited to this example. The optical deflection unit 100 may also be installed on a side face of the case 12. Additionally, an example in which the optical deflection unit 100 is detachably installed on the case 12 is illustrated, but the optical deflection unit 100 may also be permanently affixed to the case 12, and may have an extensible structure, a folding structure, or the like for housing the optical deflection unit 100 inside the case 12 when not in use. This arrangement makes it possible to keep the user from moving the optical deflection unit unintentionally when carrying the equipment, performing experiment operations, and the like, and thereby disturbing the observation optical system. Also, FIGS. 5 and 6 illustrate an example in which the optical deflection unit 100 is installed on the case 12, but it is sufficient for the optical deflection unit 100 to be included in the observation apparatus 10, and the optical deflection unit 100 may also be disposed separately from the case 12, for example.

As illustrated in FIG. 6, the optical deflection unit 100 includes a support pillar 101 and a reflective surface 102. The support pillar 101 has a shape that is bent between a base end affixed to the transmissive window 11 and a free end, and includes a first portion that includes the base end and extends vertically and a second portion that includes the free end and extends obliquely from the first portion. More specifically, the first portion extends to a height sufficient enough for the culture container not to contact the second portion even in the case where a tall culture container is placed on the transmissive window 11. Also, the second portion extends upward from the first portion with respect to the horizontal direction to optimize the angle distribution of light incident on the imaging unit 15. Note that the optical deflection unit 100 may also have a configuration that does not include the support pillar 101.

The reflective surface 102 is formed on the face of the second portion the support pillar 101 facing the transmissive window 11. Because the second portion extends upward with respect to the horizontal direction, the reflective surface 102 is inclined with respect to the optical axis of the optical system 18 included in the imaging unit 15. Note that the reflective surface 102 being inclined with respect to the optical axis means that the normal of the reflective surface 102 is pointed in a different direction than the optical axis. In addition, the reflective surface 102 may include a metal thin-film mirror or a dielectric multilayer film mirror formed on the surface of the support pillar 101 that acts as a base material, and may also be a configuration that reflects incident light without performing any particular reflective processing.

In the observation apparatus 10 configured as above, an optical image is formed on the imaging element 19 by the image formation method illustrated in FIG. 7. Specifically, first, the light source unit 14 emits light from the inside of the case 12 toward the outside of the case 12 (step S1). Thereafter, the optical deflection unit 100 deflects the light emitted to the outside of the case 12 to a direction proceeding toward the transmissive window 11 (hereinafter, the first direction) (step S2).

Specifically, in step S2, the reflective surface 102 inclined with respect to the optical axis reflects light that transmits through the top face of the culture container C and is incident on the optical deflection unit 100. In other words, the light emitted from the light source unit 14 to the outside of the case 12 is deflected in the first direction toward the transmissive window 11 by the optical deflection unit 100 by an angle of exit θex different from the angle of incidence θin, more specifically, an angle of exit θex that is larger than the angle of incidence θin. Note that, as illustrated in FIG. 6, the angle of incidence θin is the angle between the direction in which light is emitted from the light source unit 14 and incident on the optical deflection unit 100 (hereinafter designated the second direction) and the optical axis of the optical system 18, and the angle of exit θex is the angle between the first direction and the optical axis of the optical system 18.

With this arrangement, even in the case where a tall culture container is used and light is deflected at a position high enough not to contact the culture container, a pencil of light containing light deflected by the optical deflection unit 100 and passing through a single point on the sample S is distributed straddling the outer edge of the pupil PL of the optical system 18 in the pupil plane of the optical system 18, like when using a culture container of standard height. In other words, in the optical deflection unit 100, the inclination angle of the reflective surface 102 is predetermined such that the pencil of light passing through a single point on the sample S is distributed straddling the outer edge of the pupil PL in the pupil plane of the optical system 18.

Finally, to form an image on the imaging element 19 of the sample S inside the culture container C placed on the transmissive window 11, the optical system 18 of the imaging unit 15 condenses light that is incident inside the case 12 by transmitting through the transmissive window 11 (step S3). With this arrangement, an optical image of the sample S is formed on the imaging element 19, and an image of the sample S is acquired.

In the observation apparatus 10 according to the present embodiment, an optical image of the sample S can be formed with light deflected by the optical deflection unit 100 by an angle of exit θex that is larger than the angle of incidence θin. Consequently, according to the observation apparatus 10 according to the present embodiment, it is possible to visualize the sample S at high contrast regardless of the culture container that houses the sample S, enabling the observation apparatus 10 to exhibit high observation performance. Consequently, a sample housed in any culture container and not just the standard culture container C can be observed favorably.

Furthermore, in the observation apparatus 10 according to the present embodiment, by having the reflective surface 102 include a mirror with high reflectance, the optical deflection unit 100 can deflect incident light efficiently. Consequently, according to the observation apparatus 10 according to the present embodiment, a bright image with high contrast can be obtained.

Figure 8:
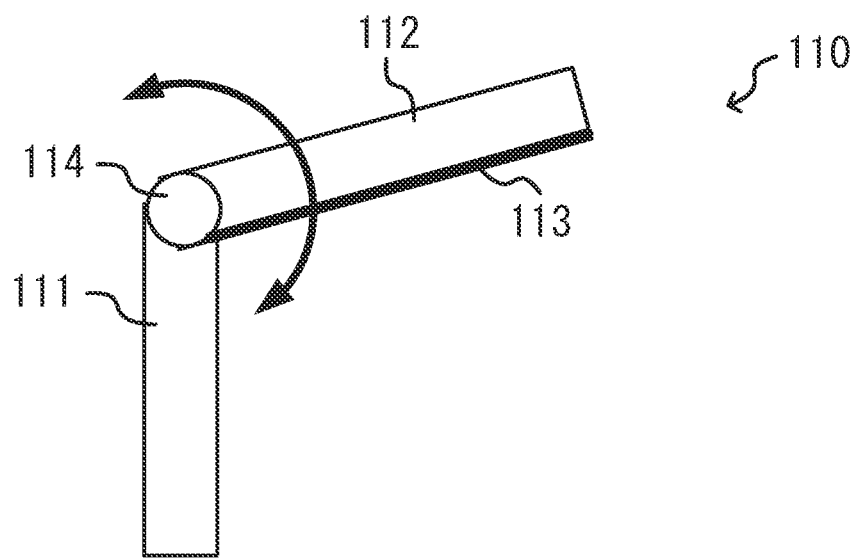
FIG. 8 is a diagram for explaining another example of the configuration of the optical deflection unit.
Figure 9:
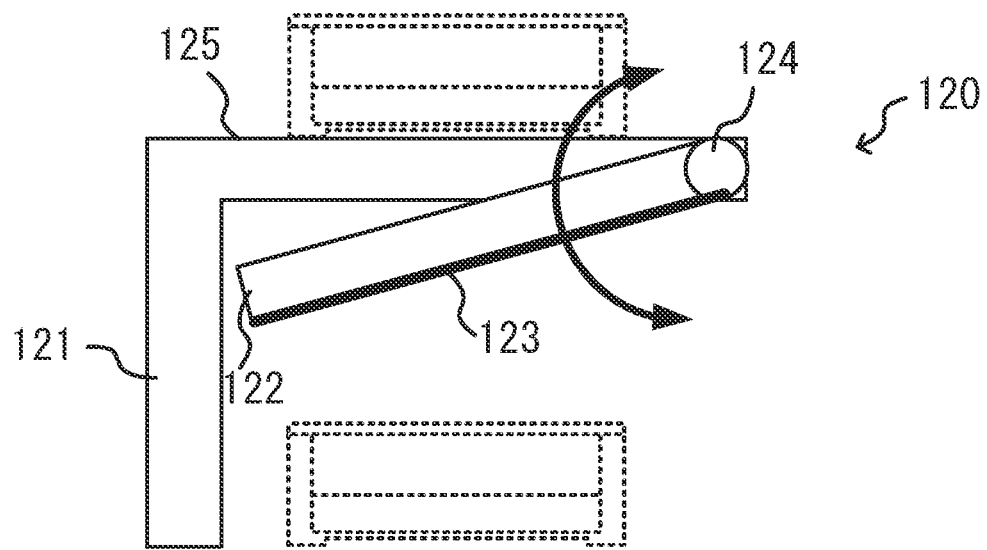
FIG. 9 is a diagram for explaining yet another example of the configuration of the optical deflection unit.
Figure 10:
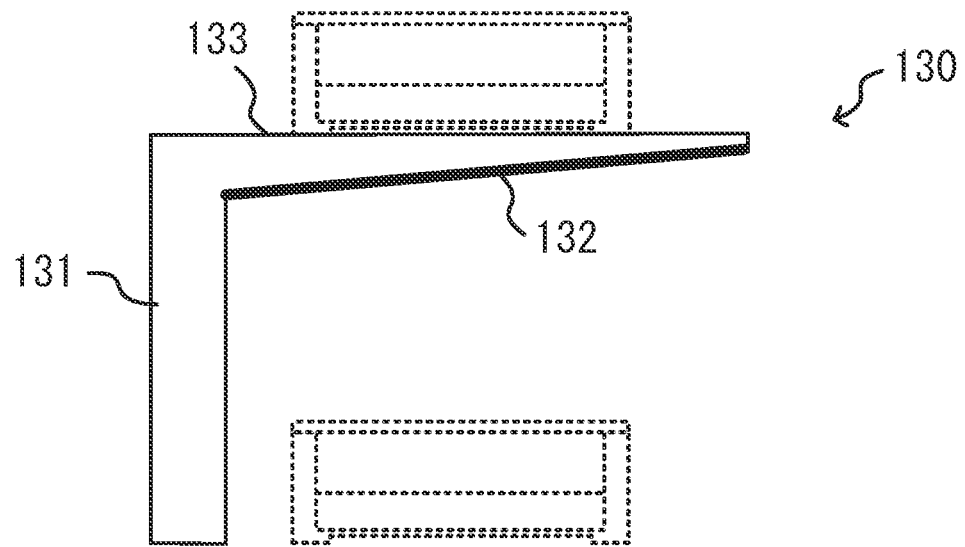
FIG. 10 is a diagram for explaining yet another example of the configuration of the optical deflection unit.

FIG. 8 is a diagram for explaining another example of the configuration of the optical deflection unit. FIG. 9 is a diagram for explaining yet another example of the configuration of the optical deflection unit. FIG. 10 is a diagram for explaining yet another example of the configuration of the optical deflection unit. The above describes the case where the observation apparatus 10 includes the optical deflection unit 100 as an example, and the observation apparatus 10 may also include an optical deflection unit 110, an optical deflection unit 120, or an optical deflection unit 130 illustrated in FIGS. 8 to 10 instead of the optical deflection unit 100.

The optical deflection unit 110 illustrated in FIG. 8 is provided with a support pillar 111, a movable piece 112 having an axle 114 and rotatably supported by the support pillar 111, and a reflective surface 113 formed on the movable piece 112. Note that the movable piece 112 is an example of an adjustment unit that adjusts the angle of the reflective surface 113 with respect to the optical axis.

The observation apparatus 10 is capable of achieving high observation performance regardless of the culture container, even in the case where the optical deflection unit 110 is included instead of the optical deflection unit 100. Also, by including the optical deflection unit 110, the movable piece 112 can be used to adjust the angle of the reflective surface 113 with respect to the optical axis and adjust the angle distribution of light incident on the optical system 18. Consequently, the contrast of the image can also be adjusted according to factors such as the sample S and the preferences of the observer. Furthermore, the angle of the reflective surface 113 may be adjusted and the contrast of the image may be adjusted according to factors such as the specifications (for example, the observation magnification and the numerical aperture) of the optical system 18.

The optical deflection unit 120 illustrated in FIG. 9 is provided with a support pillar 121 having a face 125, a movable piece 122 having an axle 124 and rotatably supported by the support pillar 121, and a reflective surface 123 formed on the movable piece 122. Note that the movable piece 122 is an example of an adjustment unit that adjusts the angle of the reflective surface 123 with respect to the optical axis. The optical deflection unit 120 is similar to the optical deflection unit 110 in that the support pillar 121 has a shape that is bent between a base end affixed to the transmissive window 11 and a free end. However, the optical deflection unit 120 differs from the optical deflection unit 110 in that the support pillar 121 includes a first portion that includes the base end and extends vertically and a second portion that includes the free end and extends horizontally from the first portion.

The observation apparatus 10 is capable of achieving high observation performance regardless of the culture container, even in the case where the optical deflection unit 120 is included instead of the optical deflection unit 100. Also, by including the optical deflection unit 120, similarly to the optical deflection unit 110, the angle distribution of light incident on the optical system 18 can be adjusted, and the contrast can also be adjusted according to factors such as the sample S and the preferences of the observer, and also according to the specifications of the optical system 18.

Furthermore, by including the optical deflection unit 120 in which the support pillar 121 is bent in the horizontal direction, the face 125 that acts as the top face of the support pillar 121 is horizontal. For this reason, a culture container can be placed on the face 125. This configuration makes it possible to use the limited space inside the incubator 20 efficiently.

Note that the face 125 is an example of a first face which is included in the optical deflection unit 120 and which does not face opposite the transmissive window 11. FIG. 9 illustrates an example in which the entire face 125 is horizontal, or in other words is a plane parallel to the transmissive window 11, but it is sufficient if at least a part of the face 125 is a plane parallel to the transmissive window 11 so as to allow a culture container to be placed, and it is sufficient if a culture container can be supported horizontally. Insofar as a culture container can be supported horizontally, a positioning member that allows for easy placement of a culture container may also be provided, and raised or depressed portions may also be provided in a part of the face 125. Note that in the optical deflection units described hereinafter, a face included in these optical deflection units that allows a culture container to be placed thereon and does not face opposite the transmissive window likewise is an example of the first face.

The optical deflection unit 130 illustrated in FIG. 10 is provided with a support pillar 131 having a face 133, and a reflective surface 132 formed on the support pillar 131. Note that the optical deflection unit 130 differs from the optical deflection unit 100 in that the face 133 that acts as the top face of the second portion of the support pillar 131 is a horizontal plane. Otherwise, the configuration is similar to the optical deflection unit 100.

The observation apparatus 10 is capable of achieving high observation performance regardless of the culture container, even in the case where the optical deflection unit 130 is included instead of the optical deflection unit 100. Also, by including the optical deflection unit 130, a culture container can be placed on the face 133. Like the optical deflection unit 120, this configuration makes it possible to use the limited space inside the incubator 20 efficiently.

Second Embodiment

Figure 11:
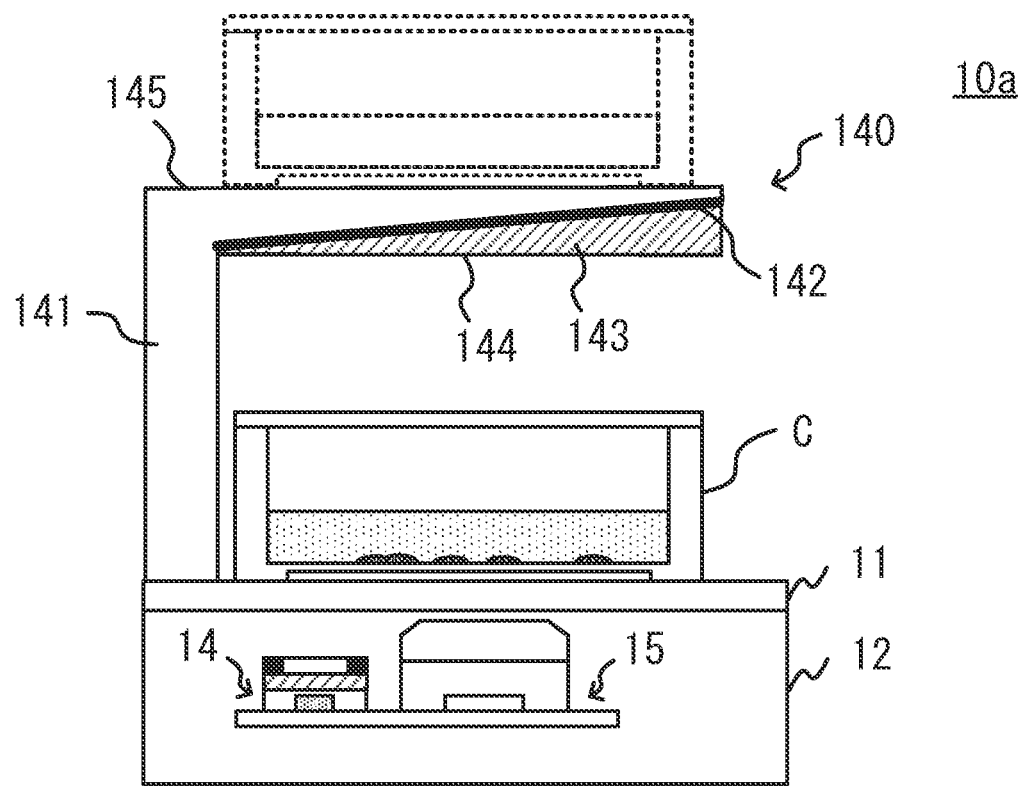
FIG. 11 is a diagram illustrating an example of a configuration of an observation apparatus 10a according to a second embodiment.

FIG. 11 is a diagram illustrating an example of a configuration of an observation apparatus 10a according to the present embodiment. The observation apparatus 10a according to the present embodiment differs from the observation apparatus 10 according to the first embodiment by including an optical deflection unit 140 instead of the optical deflection unit 100. More specifically, the observation apparatus 10a and the optical deflection unit 140 differ from the observation apparatus 10 and the optical deflection unit 100 by including a refractive surface that refracts incident light with the optical deflection unit, in addition to the reflective surface. Hereinafter, the configuration will be described specifically with reference to FIG. 11.

The optical deflection unit 140 is provided with a support pillar 141 having a face 145, a reflective surface 142 formed on the support pillar 141, and a prism 143 disposed to cover the reflective surface 142. Note that except for the prism 143, the configuration of the optical deflection unit 140 is similar to the optical deflection unit 130.

The prism 143 is wedge-shaped, and combines with the second portion of the support pillar 141 to form a flat table of uniform thickness. Additionally, the prism 143 has a face 144 that faces opposite the transmissive window 11. The face 144 is a refractive surface that refracts light incident on the optical deflection unit 140, and is provided on the optical path between the transmissive window 11 and the reflective surface 142. For this reason, the face 144 acts on the light twice, before and after the light is reflected by the reflective surface 142. In particular, light that has reflected off the reflective surface 142 and is traveling at a larger angle with respect to the optical axis compared to when the light was incident can be deflected by the face 144 to travel at an even larger angle with respect to the optical axis, thereby increasing the difference between the angle of incidence θin and the angle of exit θex of the optical deflection unit 140.

With the observation apparatus 10a according to the present embodiment, an optical image of the sample S likewise can be formed with light deflected by the optical deflection unit 140 by an angle of exit θex that is larger than the angle of incidence θin. Consequently, according to the observation apparatus 10a according to the present embodiment, similarly to the observation apparatus 10, it is possible to visualize the sample S at high contrast, enabling the observation apparatus 10a to exhibit high observation performance regardless of the culture container that houses the sample S. Consequently, a sample housed in any culture container and not just the standard culture container C can be observed favorably.

Furthermore, in the observation apparatus 10a, an angular difference between the angle of incidence θin and the angle of exit θex can be gained from the refraction by the refractive surface in addition to the reflection by the reflective surface. Consequently, sufficient optical performance can be exhibited even in the case of using an optical system having a larger numerical aperture. Also, because a sufficient angular difference can be gained while also reducing the inclination of the reflective surface 142, the thickness of the second portion of the support pillar 141 can also be reduced.

Figure 12:
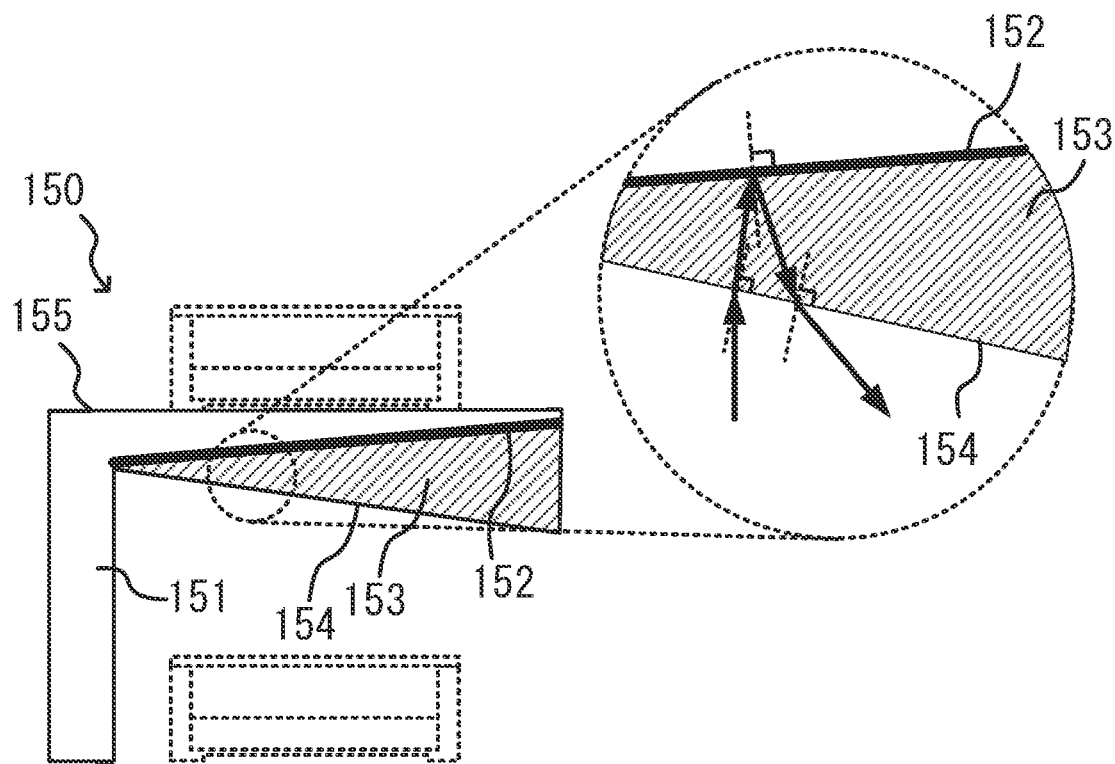
FIG. 12 is a diagram for explaining yet another example of the configuration of the optical deflection unit.

FIG. 12 is a diagram for explaining yet another example of the configuration of the optical deflection unit. The above describes the case where the observation apparatus 10a includes the optical deflection unit 140 as an example, but the observation apparatus 10a may also include an optical deflection unit 150 illustrated in FIG. 12 instead of the optical deflection unit 140.

The optical deflection unit 150 illustrated in FIG. 12 is provided with a support pillar 151 having a face 155, a reflective surface 152 formed on the support pillar 151, and a prism 153 disposed to cover the reflective surface 152. In this respect, the configuration is similar to the optical deflection unit 140.

The prism 153 is wedge-shaped like the prism 143, but differs from the prism 143 in that the angle of the wedge is greater than the prism 143. Additionally, as a consequence of the above, the prism 153 differs from the prism 143 in that a face 154 that faces opposite the transmissive window 11 (more strictly, the normal of the face 154) is inclined with respect to the optical axis. Note that the face 154 is inclined in the opposite direction of the inclination of the reflective surface 152. In the case where the reflective surface 152 is inclined upward with respect to the horizontal direction, the face 154 is inclined downward with respect to the horizontal direction.

The observation apparatus 10a is capable of achieving high observation performance regardless of the culture container, even in the case where the optical deflection unit 150 is included instead of the optical deflection unit 140. Also, by including the optical deflection unit 150 that includes the refractive surface inclined with respect to the optical axis, as illustrated in FIG. 12, light incident on the optical deflection unit 150 by traveling in the vertical direction that is expected to have the strongest intensity can be refracted at the face 154 both before and after the light is reflected by the reflective surface 152, and therefore a larger refractive effect can be produced by the refractive surface (face 154). Consequently, sufficient optical performance can be exhibited even in the case of using an optical system having a larger numerical aperture.

Third Embodiment

Figure 13:
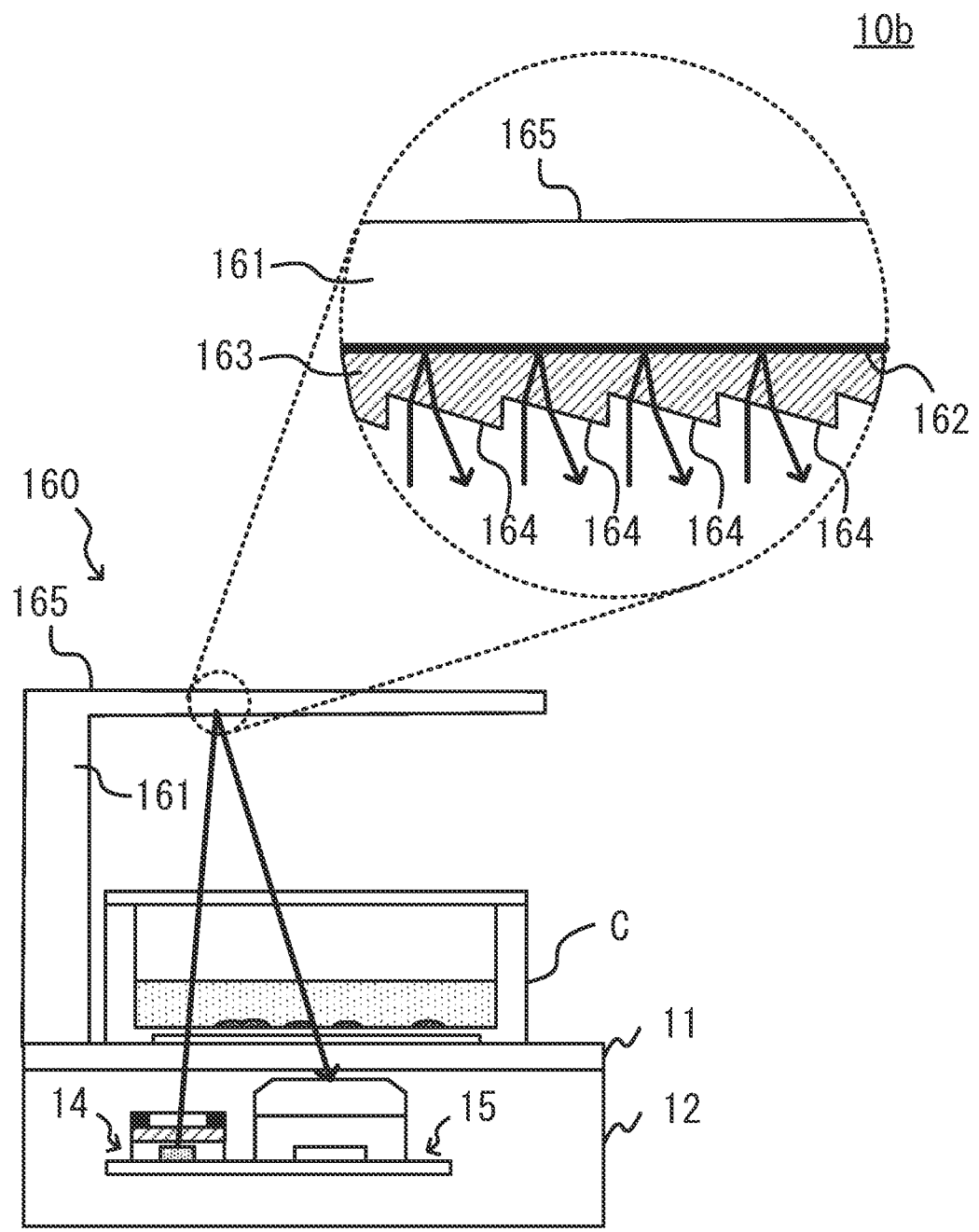
FIG. 13 is a diagram illustrating an example of a configuration of an observation apparatus 10b according to a third embodiment.

FIG. 13 is a diagram illustrating an example of a configuration of an observation apparatus 10b according to the present embodiment. The observation apparatus 10b according to the present embodiment differs from the observation apparatus 10a according to the second embodiment by including an optical deflection unit 160 instead of the optical deflection unit 140. The observation apparatus 10b and the optical deflection unit 160 differ from the observation apparatus 10a and the optical deflection unit 140 according to the second embodiment by including a linear prism plate 163 having a plurality of refractive surfaces instead of the prism 143 having a refractive surface. Hereinafter, the configuration will be described specifically with reference to FIG. 13.

The optical deflection unit 160 is provided with a support pillar 161 having a face 165, a reflective surface 162 formed on the support pillar 161, and a linear prism plate 163 disposed to cover the reflective surface 162. Note that the support pillar 161 includes a first portion that extends from a base end in the extension direction and a second portion that extends horizontally from the first portion, and the reflective surface 162 is parallel to the transmissive window 11.

The linear prism plate 163 includes faces 164 that act as a plurality of refractive surfaces arranged in a direction intersecting the optical axis. Each of the faces 164 is a refractive surface which refracts light incident on the optical deflection unit 160 and which is inclined with respect to the optical axis, and is provided on the optical path between the reflective surface 162 and the transmissive window 11. Also, the plurality of refractive surfaces have the same inclination angle, and are also formed at equally-spaced intervals. In other words, the optical deflection unit 160 has a periodic structure in a direction intersecting the optical axis. By having such a periodic structure, the linear prism plate 163 can be formed relatively thinly while still having a refractive effect sufficient to largely differentiate the angle of incidence θin and the angle of exit θex of the optical deflection unit 160.

As illustrated in FIG. 13, by having each of the faces 164 act on the light similarly to the face 154 illustrated in FIG. 12, the observation apparatus 10b according to the present embodiment is also capable of forming an optical image of the sample S with light deflected by the optical deflection unit 160 by an angle of exit θex that is larger than the angle of incidence θin. Consequently, according to the observation apparatus 10b according to the present embodiment, similarly to the observation apparatus 10a, it is possible to visualize the sample S at high contrast, enabling the observation apparatus 10b to exhibit high observation performance regardless of the culture container that houses the sample S. Consequently, a sample housed in any culture container and not just the standard culture container C can be observed favorably.

Furthermore, in the observation apparatus 10b, because the reflective surface 162 is not inclined horizontally, the thickness of the optical deflection unit 160 can be reduced. Also, even in the case where the light source unit 14 and the imaging unit 15 move inside the case 12 in accordance with the observation position, the distance from the light source unit 14 and the imaging unit 15 to the faces 164 and the reflective surface 162 does not change substantially. For this reason, the sample S can be observed under the same conditions, regardless of the observation position. Additionally, because the second portion has a horizontal top face, an additional culture container can be placed on top of the second portion. This configuration makes it possible to use the limited space inside the incubator 20 efficiently.

FIGS. 14 to 19 are diagrams for respectively explaining other examples of the configuration of the optical deflection unit. The above describes the case where the observation apparatus 10b includes the optical deflection unit 160 as an example, but the observation apparatus 10b may also include any of the optical deflection units 170 to 220 illustrated in FIGS. 14 to 19 instead of the optical deflection unit 160.

Figure 14:
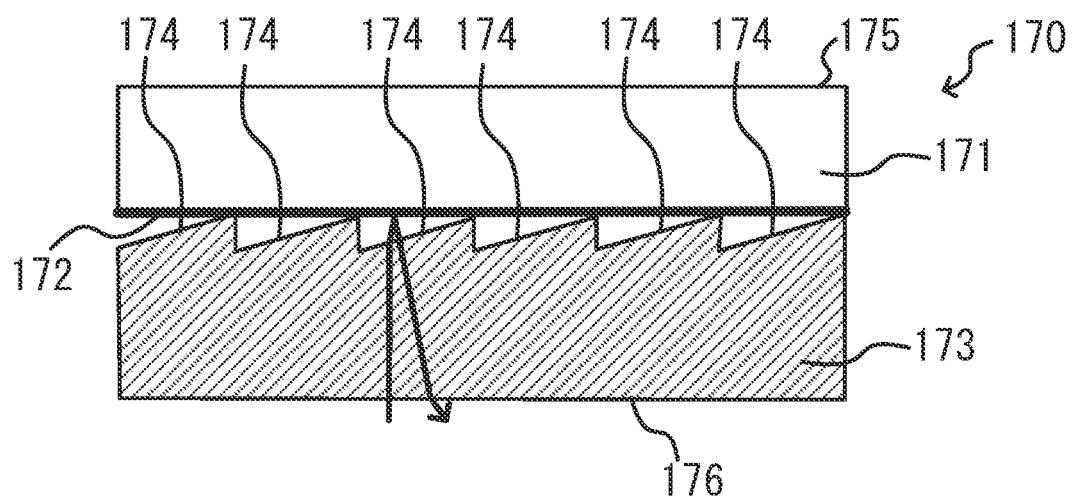
FIG. 14 is a diagram for explaining yet another example of the configuration of the optical deflection unit.

The optical deflection unit 170 illustrated in FIG. 14 is provided with a support pillar 171 having a face 175, a reflective surface 172 formed on the support pillar 171, and a linear prism plate 173. Note that the optical deflection unit 170 differs from the optical deflection unit 160 in that the linear prism plate 173 is pointed in the vertically opposite direction compared to the linear prism plate 163 of the optical deflection unit 160. In other words, in the optical deflection unit 170, a plurality of faces 174 that each function as a refractive surface are provided near the reflective surface 172, and a horizontal face 176 is pointed toward the transmissive window 11. Note that the faces 174 are inclined in the opposite direction of the inclination of the faces 164 of the optical deflection unit 160. In the case where the faces 164 are inclined downward with respect to the horizontal direction, the faces 174 are inclined upward with respect to the horizontal direction.

Even in the case where the observation apparatus 10b includes the optical deflection unit 170 instead of the optical deflection unit 160, as illustrated in FIG. 14, by having each of the faces 174 act on the light similarly to the faces 164 illustrated in FIG. 12, an optical image of the sample S can be formed with light deflected by the optical deflection unit 170 by an angle of exit θex that is larger than the angle of incidence θin. Furthermore, because the face 176 in addition to the faces 174 also acts as a refractive surface that increases the angle of exit θex with respect to the angle of incidence θin, an angular difference even larger than the optical deflection unit 160 can be produced. Consequently, even in the case where the optical deflection unit 170 is included, according to the observation apparatus 10*b* according to the present embodiment, it is possible to visualize the sample S at high contrast, enabling the observation apparatus 10*b* to exhibit high observation performance regardless of the culture container that houses the sample S. Consequently, a sample housed in any culture container and not just the standard culture container C can be observed favorably. In addition, the thickness of the optical deflection unit 170 can be reduced and the sample S can be observed under the same conditions regardless of the observation position, similarly to the case of including the optical deflection unit 160. Furthermore, in the optical deflection unit 170, the plurality of faces 174 are provided inside the optical deflection unit 170 and are not exposed to the outside. As a result, it is sufficient to clean only the flat portion, which makes cleaning the optical deflection unit 170 easy.

Figure 15:
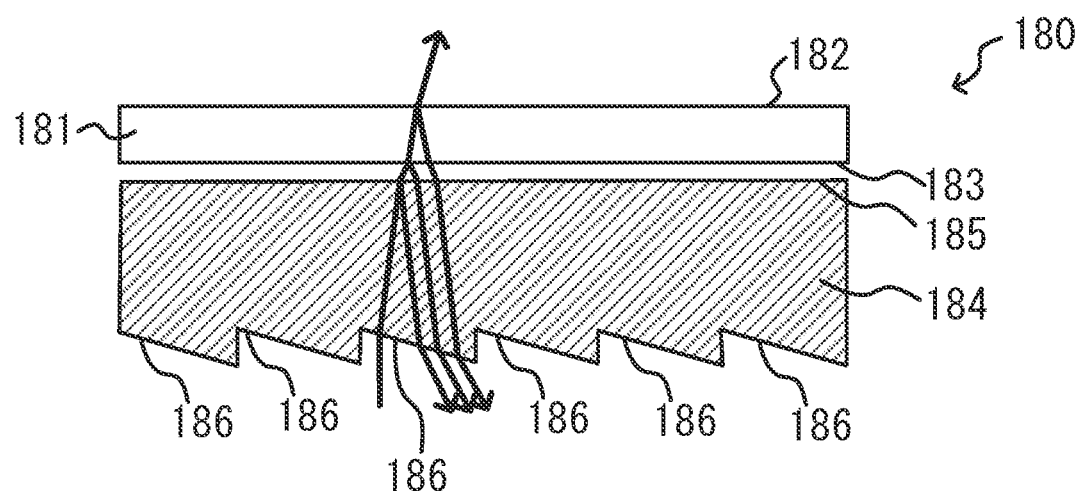
FIG. 15 is a diagram for explaining yet another example of the configuration of the optical deflection unit.

The optical deflection unit 180 illustrated in FIG. 15 is provided with a support pillar 181 having a face 182 and a face 183, and a linear prism plate 184 supported at a distance from the support pillar 181. Note that the linear prism plate 184 may be substantially the same as the linear prism plate 163, and includes faces 186 that act as a plurality of refractive surfaces arranged in a direction intersecting the optical axis, and a face 185 opposite the face 183.

In the optical deflection unit 180, by having the faces 186 act similarly to the faces 164, an angular difference between the angle of incidence θin and the angle of exit θex can be created. Also, in the optical deflection unit 180, a plurality of reflective surfaces (face 185, face 183, face 182) that produce Fresnel reflections are provided instead of a reflective surface including a mirror. These reflective surfaces act similarly to the reflective surface 162, and thereby can deflect light toward the transmissive window 11.

Consequently, even in the case where the optical deflection unit 180 is included, according to the observation apparatus 10*b* according to the present embodiment, it is possible to visualize the sample S at high contrast, enabling the observation apparatus 10*b* to exhibit high observation performance regardless of the culture container that houses the sample S. Consequently, a sample housed in any culture container and not just the standard culture container C can be observed favorably. In addition, the thickness of the optical deflection unit 180 can be reduced and the sample S can be observed under the same conditions regardless of the observation position, similarly to the case of including the optical deflection unit 160. Furthermore, because the optical deflection unit 180 has a structure that reflects light with Fresnel reflections, the observer is able to see the culture container C through the optical deflection unit 180 from above the optical deflection unit 180.

Figure 16:
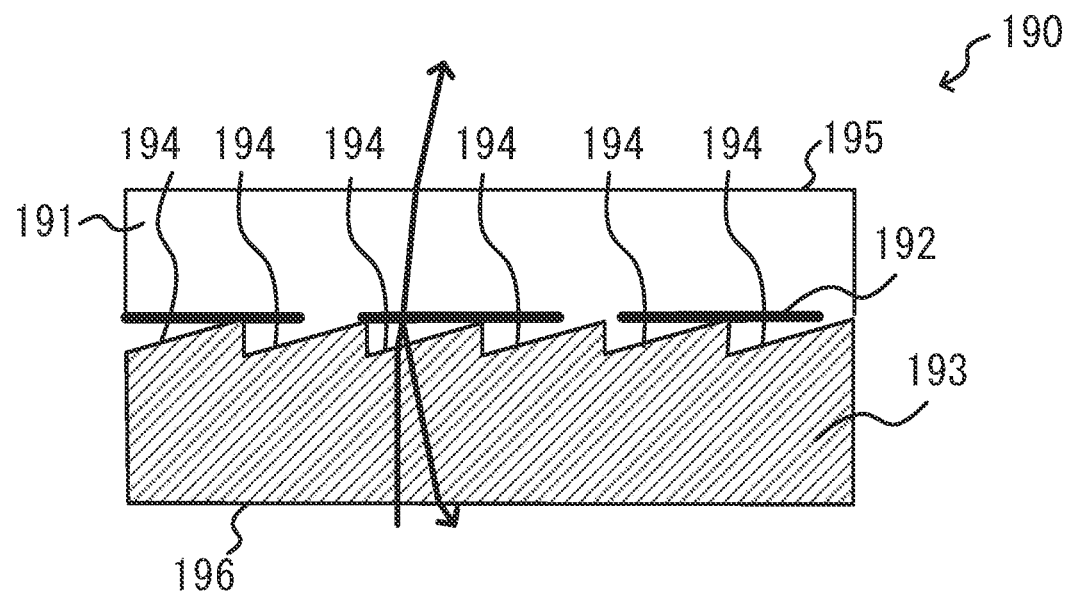
FIG. 16 is a diagram for explaining yet another example of the configuration of the optical deflection unit.

The optical deflection unit 190 illustrated in FIG. 16 is provided with a support pillar 191 having a face 195, a reflective surface 192 formed on the support pillar 191, and a linear prism plate 193. Note that the optical deflection unit 190 differs from the optical deflection unit 170 in that the reflective surface 192 is a partially reflective mirror or splitter that reflects some of the incident light and transmits the rest, such as a half-mirror, for example. Otherwise, the optical deflection unit 190 is similar to the optical deflection unit 170.

Consequently, even in the case where the optical deflection unit 190 is included, according to the observation apparatus 10*b* according to the present embodiment, it is possible to visualize the sample S at high contrast, enabling the observation apparatus 10*b* to exhibit high observation performance regardless of the culture container that houses the sample S, similarly to the case of including the optical deflection unit 170. Consequently, a sample housed in any culture container and not just the standard culture container C can be observed favorably. In addition, the thickness of the optical deflection unit 190 can be reduced and the sample S can be observed under the same conditions regardless of the observation position, similarly to the case of including the optical deflection unit 170. Furthermore, because the optical deflection unit 190 has a structure that reflects light with a partially reflective mirror, the observer is able to see the culture container C through the optical deflection unit 190 from above the optical deflection unit 190. Specifically, in the case of wanting to check the state of the culture container C through a transparent window of the incubator from outside the incubator 20 while leaving the culture container C placed inside the incubator 20, the culture container C can be seen through the optical deflection unit 190 even if the culture container C and the optical deflection unit 190 are placed in a lower part of the incubator 20 (a position where the user's line of sight is obstructed by the optical deflection unit), and the work efficiency of the worker is improved.

Figure 17:
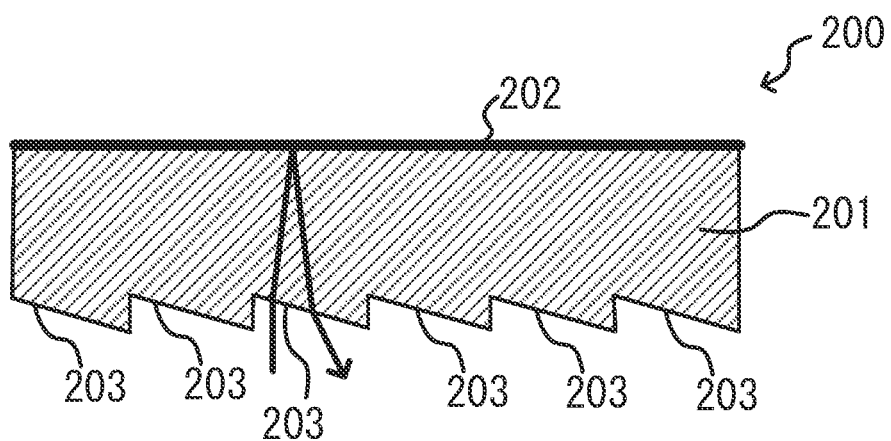
FIG. 17 is a diagram for explaining yet another example of the configuration of the optical deflection unit.

The optical deflection unit 200 illustrated in FIG. 17 includes a linear prism plate 201 on which a reflective surface 202 is formed. In addition to the reflective surface 202, the linear prism plate 201 includes faces 203 that act as a plurality of refractive surfaces arranged in a direction intersecting the optical axis. Each of the faces 203 is a refractive surface which refracts light incident on the optical deflection unit 200 and which is inclined with respect to the optical axis, and is provided on the optical path between the reflective surface 202 and the transmissive window 11.

In the optical deflection unit 200, by having the reflective surface 202 formed on the linear prism plate 201 act similarly to the reflective surface 162 formed on the support pillar 161 of the optical deflection unit 160, and by having the faces 203 act similarly to the faces 164 of the optical deflection unit 160, an angular difference between the angle of incidence θin and the angle of exit θex can be created.

Consequently, even in the case where the optical deflection unit 200 is included, according to the observation apparatus 10*b* according to the present embodiment, it is possible to visualize the sample S at high contrast, enabling the observation apparatus 10*b* to exhibit high observation performance regardless of the culture container that houses the sample S, similarly to the case of including the optical deflection unit 160. Consequently, a sample housed in any culture container and not just the standard culture container C can be observed favorably. Also, by forming a reflective surface on the surface of the linear prism plate 201, the thickness of the optical deflection unit 200 can be reduced further. Note that the sample S can be observed under the same conditions regardless of the observation position, similarly to the case of including the optical deflection unit 160.

Figure 18:
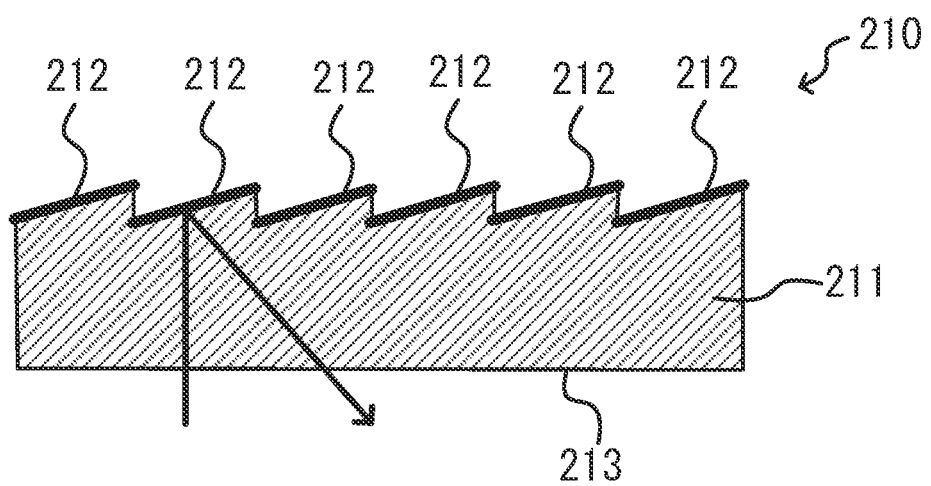
FIG. 18 is a diagram for explaining yet another example of the configuration of the optical deflection unit.

The optical deflection unit 210 illustrated in FIG. 18 includes a linear prism plate 211. The linear prism plate 211 includes reflective surfaces 212 that act as a plurality of reflective surfaces arranged in a direction intersecting the optical axis, and a face 213 that acts as a refractive surface. Each of the reflective surfaces 212 is a reflective surface inclined with respect to the optical axis, and by reflecting light with the reflective surfaces 212 in the optical deflection unit 210, it is possible to create an angular difference between the angle of incidence θin and the angle of exit θex, and furthermore, the angular difference can be widened by the face 213.

Consequently, even in the case where the optical deflection unit 210 is included, according to the observation apparatus 10b according to the present embodiment, it is possible to visualize the sample S at high contrast, enabling the observation apparatus 10b to exhibit high observation performance regardless of the culture container that houses the sample S, similarly to the case of including the optical deflection unit 160. Consequently, a sample housed in any culture container and not just the standard culture container C can be observed favorably. In addition, by forming a reflective surface on the surface of the linear prism plate 211, the thickness of the optical deflection unit 210 can be reduced further and the sample S can be observed under the same conditions regardless of the observation position, similarly to the case of including the optical deflection unit 200.

Figure 19:
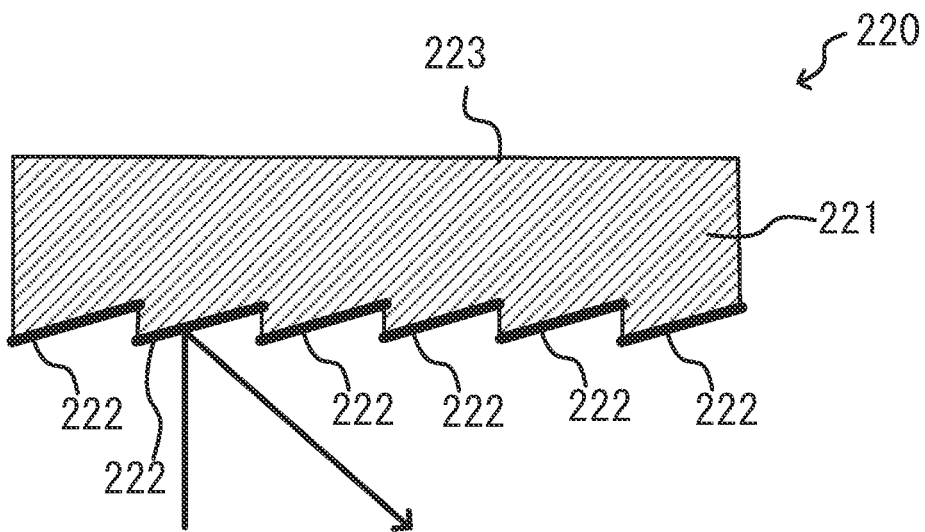
FIG. 19 is a diagram for explaining yet another example of the configuration of the optical deflection unit.

The optical deflection unit 220 illustrated in FIG. 19 includes a linear prism plate 221. The linear prism plate 221 includes reflective surfaces 222 that act as a plurality of reflective surfaces arranged in a direction intersecting the optical axis, and a face 223. The optical deflection unit 220 is similar to the optical deflection unit 210, except that the reflective surfaces 222 are provided facing the transmissive window 11. The reflective surfaces 222 are also inclined in the same direction of the inclination of the reflective surfaces 212 of the optical deflection unit 210. In other words, in the case where the reflective surfaces 212 are inclined upward with respect to the horizontal direction, the reflective surfaces 222 are inclined upward with respect to the horizontal direction. In the optical deflection unit 220, by reflecting light with the reflective surfaces 222, an angular difference between the angle of incidence θin and the angle of exit θex can be created.

Consequently, even in the case where the optical deflection unit 220 is included, according to the observation apparatus 10b according to the present embodiment, it is possible to visualize the sample S at high contrast, enabling the observation apparatus 10b to exhibit high observation performance regardless of the culture container that houses the sample S, similarly to the case of including the optical deflection unit 210. Consequently, a sample housed in any culture container and not just the standard culture container C can be observed favorably. In addition, by forming a reflective surface on the surface of the linear prism plate 221, the thickness of the optical deflection unit 220 can be reduced further and the sample S can be observed under the same conditions regardless of the observation position, similarly to the case of including the optical deflection unit 210.

Fourth Embodiment

Figure 20:
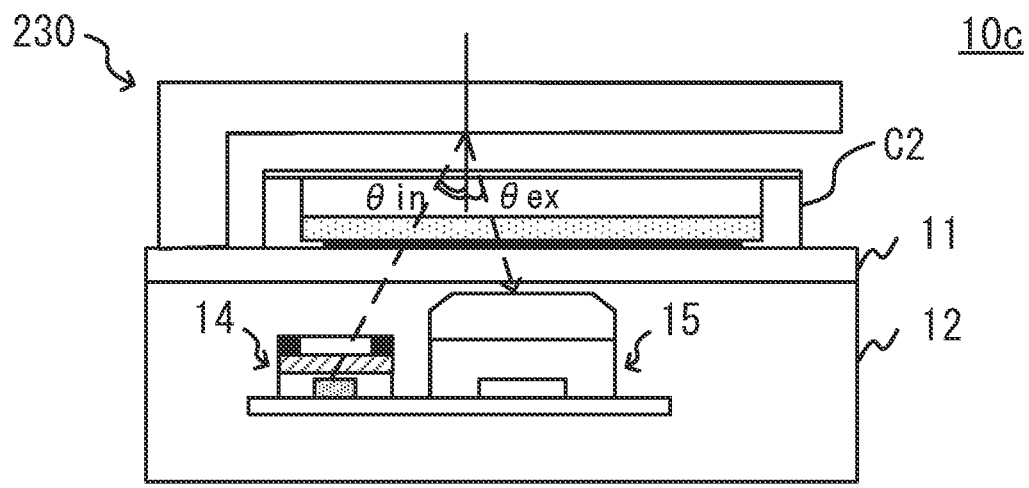
FIG. 20 is a diagram illustrating an example of a configuration of an observation apparatus 10c according to a fourth embodiment.

FIG. 20 is a diagram illustrating an example of a configuration of an observation apparatus 10c according to the present embodiment. FIG. 21 is a diagram for explaining yet another example of the configuration of the optical deflection unit. As described above with reference to FIG. 3, when visualizing the sample S by relying on light reflected by the top face of the culture container, contrast is lowered if the culture container is too tall. However, a shorter culture container is not necessarily better. If the culture container is too short, an adequate range cannot be illuminated with light reflected by the top face of the culture container, and the entire field of view of the imaging unit 15 can no longer be observed. This issue is particularly pronounced in the case of using an imaging unit 15 having a wide field of view and a relatively low observation magnification. The observation apparatus 10c according to the present embodiment solves such a technical problem by using an optical deflection unit 230.

The observation apparatus 10c according to the present embodiment differs from the observation apparatus 10 according to the first embodiment by including the optical deflection unit 230 illustrated in FIG. 21 instead of the optical deflection unit 100. More specifically, the observation apparatus 10c and the optical deflection unit 230 differ from the observation apparatus 10 and the optical deflection unit 100 in that the angle of exit θex from the optical deflection unit 230 is smaller than the angle of incidence θin into the optical deflection unit 230.

The optical deflection unit 230 illustrated in FIG. 21 is provided with a support pillar 231 having a face 233, a reflective surface 232 formed on the support pillar 231, and a linear prism plate 234. Note that the optical deflection unit 230 differs from the optical deflection unit 170 in that the linear prism plate 234 is pointed in the horizontally opposite direction compared to the linear prism plate 173 of the optical deflection unit 170. In other words, in the optical deflection unit 230, a plurality of faces 235 that each function as a refractive surface are provided near the reflective surface 232, and a horizontal face 236 is pointed toward the transmissive window 11. Note that the faces 235 are inclined in the opposite direction of the inclination of the faces 174 of the optical deflection unit 170. In the case where the faces 174 are inclined upward with respect to the horizontal direction, the faces 235 are inclined downward with respect to the horizontal direction. This difference in direction produces a difference such that whereas the faces 174 act on light to increase the angle of exit θex with respect to the angle of incidence θin, the faces 235 act on light to decrease the angle of exit θex with respect to the angle of incidence θin.

In the observation apparatus 10c according to the present embodiment, by decreasing the angle of exit θex with respect to the angle of incidence θin with the optical deflection unit 230, it is possible to secure an adequate illumination range, even in the case where the height of the optical deflection unit 230 is lowered to suit a culture container C2. Consequently, according to the observation apparatus 10c, the performance of the observation apparatus 10c can be exhibited sufficiently, and the entire field of view can be observed while maintaining high contrast. Furthermore, because the height of the optical deflection unit 230 can be reduced, the observation apparatus 10c can be made more compact overall.

Note that although the above illustrates an example of the observation apparatus 10c including the optical deflection unit 230, the observation apparatus 10c may also include another optical deflection unit that decreases the angle of exit θex with respect to the angle of incidence θin instead of the optical deflection unit 230. Such an optical deflection unit may be inclined in the opposite direction of an optical deflection unit having a refractive surface that increases the angle of exit θex with respect to the angle of incidence θin like the optical deflection unit 230, for example. Such an optical deflection unit may also be inclined in the opposite direction of an optical deflection unit having a reflective surface that increases the angle of exit θex with respect to the angle of incidence θin. Furthermore, the above may also be combined. Also, such an optical deflection unit may be inclined in the same direction as an optical deflection unit having a refractive surface that increases the angle of exit θex with respect to the angle of incidence θin like the optical deflection unit 240 illustrated in FIG. 22, for example. Such an optical deflection unit may also be inclined in the same direction as an optical deflection unit having a reflective surface that increases the angle of exit θex with respect to the angle of incidence θin.

Figure 22:
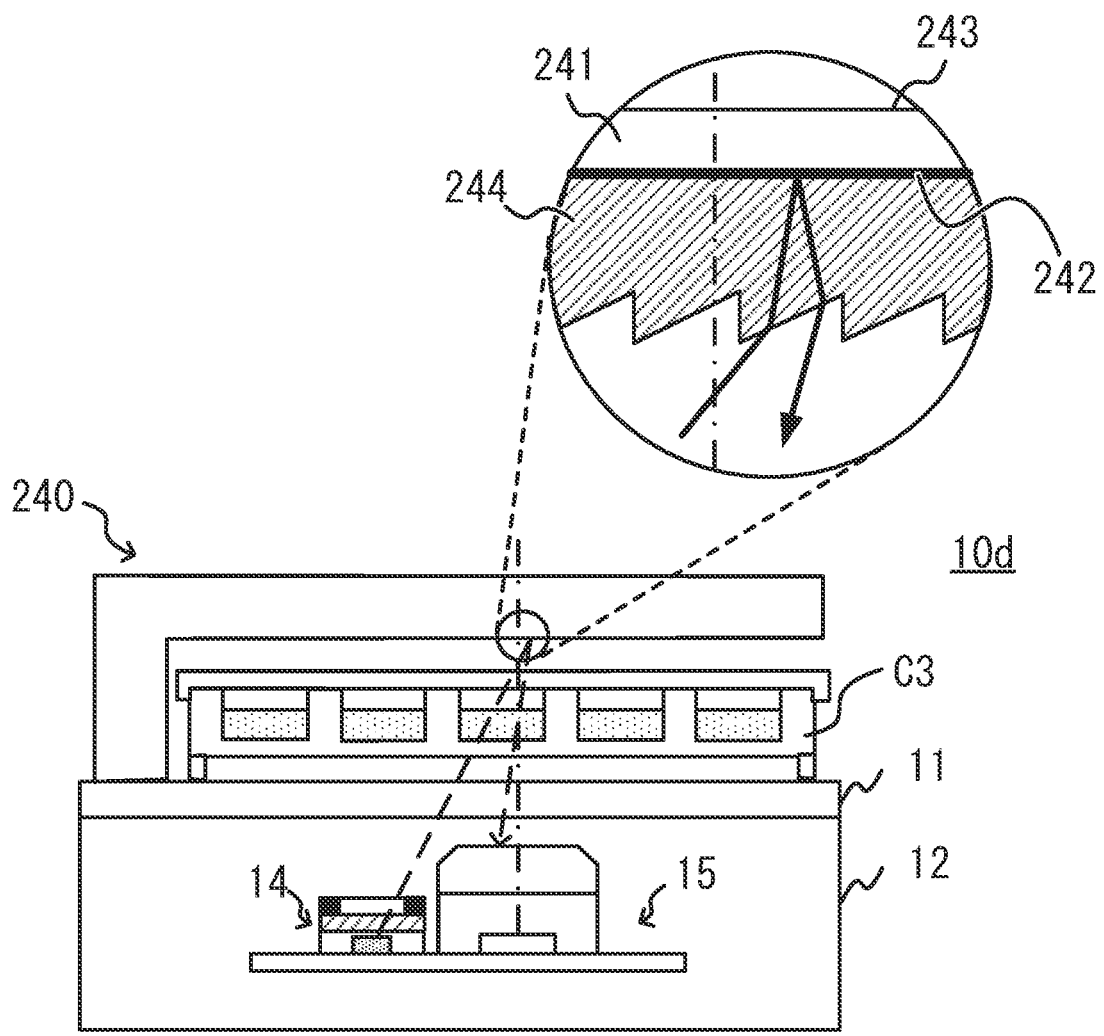
FIG. 22 is a diagram for explaining a use of the observation apparatus 10c.

Note that FIG. 20 illustrates the observation apparatus 10c including the optical deflection unit 230 that decreases the angle of exit θex with respect to the angle of incidence θin as an example of a configuration capable of securing a sufficiently wide field of view even in the case of compactly configuring the optical deflection unit by lowering the height to suit the height of the culture container, but an observation apparatus including an optical deflection unit that decreases the angle of exit θex with respect to the angle of incidence θin may also be used in the case of using a culture container C3 in which the portion that houses the sample has a small area (such as a multi-well plate having a small area per well, for example), like the observation apparatus 10d illustrated in FIG. 22.

In the case where a multi-well plate is used, if the light deflected by the optical deflection unit has a large angle of exit, the light will be blocked by the sides of the well and the like before being incident on the imaging unit 15. On the other hand, a certain degree of distance is necessary between the light source unit 14 and the imaging unit 15, and there is also a limit to adjusting this distance to decrease the angle of incidence into the optical deflection unit. Consequently, to achieve a small angle of exit, it is desirable to use a configuration that achieves an angle of exit that is smaller than the angle of incidence, like the optical deflection unit 240, and the observation apparatus 10d including the optical deflection unit 240 is preferable in the case where a multi-well plate is used.

Described specifically, in the observation apparatus 10d illustrated in FIG. 22, illuminating light emitted from the light source unit 14 passes through the gap between the well housing the sample to be observed and the imaging unit 15, travels across the optical axis of the imaging unit 15 (optical system 18), and is incident on the optical deflection unit 240 at a relatively large angle. Thereafter, the illuminating light incident on the optical deflection unit 240 is refracted by a linear prism plate 244 so as to decrease the angle with respect to the optical axis, and is reflected by a reflective surface 242 formed on a support pillar 241. The illuminating light reflected by the reflective surface 242 is refracted at the surface of the linear prism plate 244 in a direction approaching the optical axis, and exits at a smaller angle with respect to the optical axis of the imaging unit 15 (optical system 18) than when the light was incident.

In this way, by causing the illuminating light to be incident at a large angle with respect to the normal of the surface of the linear prism plate 244 and then largely refracting the illuminating light with the linear prism plate 244, the angle of the illuminating light with respect to the optical axis can be decreased, and the illuminating light can also be returned in the originating direction. The above configuration that returns illuminating light in the originating direction at a small angle is capable of returning the illuminating light to the optical system 18 from the small gap between the imaging unit 15 and the well without interfering with the sides of the container, even in the case of a culture container in which the portion that houses the sample has a small area. Consequently, the above configuration is particularly preferable in the case of using a culture container such as a multi-well plate.

The embodiments described above illustrate specific examples for facilitating the understanding of the invention, and the present invention is not limited to these embodiments. Modifications obtained by modifying the embodiments described above as well as substitutions obtained by substituting structural elements of the embodiments described above may also be included. In other words, it is possible to modify each of the embodiments within a range that does not depart from the gist and scope of the present invention. Additionally, new embodiments can be carried out by appropriately combining a plurality of structural elements disclosed in one or more of the embodiments. Also, several structural elements may be removed from the structural elements illustrated in each embodiment, and several structural elements may also be added to the structural elements illustrated in each embodiment. Furthermore, the processing sequence illustrated in each embodiment may also be performed in a different order insofar as a contradiction is not created. In other words, various modifications and alterations of the observation apparatus, optical deflection unit, and image formation method of the present invention are possible without departing from the scope of the claims.

The embodiments described above illustrate an optical deflection unit having a reflective surface as an example, but the optical deflection unit may also use a diffraction grating, such as a reflective diffraction grating for example, instead of a reflective surface. Light incident on the optical deflection unit by the reflective diffraction grating may also be largely deflected. By using a diffraction grating, it is possible to reduce the thickness of the optical deflection unit compared to the case of including a largely inclined reflective surface.

In the embodiments described above, an example in which the culture container has a specific shape such as a dish or flask is described, but because a sample can be visualized without relying on light reflected by the top face of the culture container, the culture container may have a shape that changes in various ways, and may be a transparent or semitransparent bag, for example. Particularly, in the case of adopting a bag having a container shape that changes flexibly, a bag positioning member may be installed in the case or the optical deflection unit. This configuration makes stable observation possible.

Figure 23:
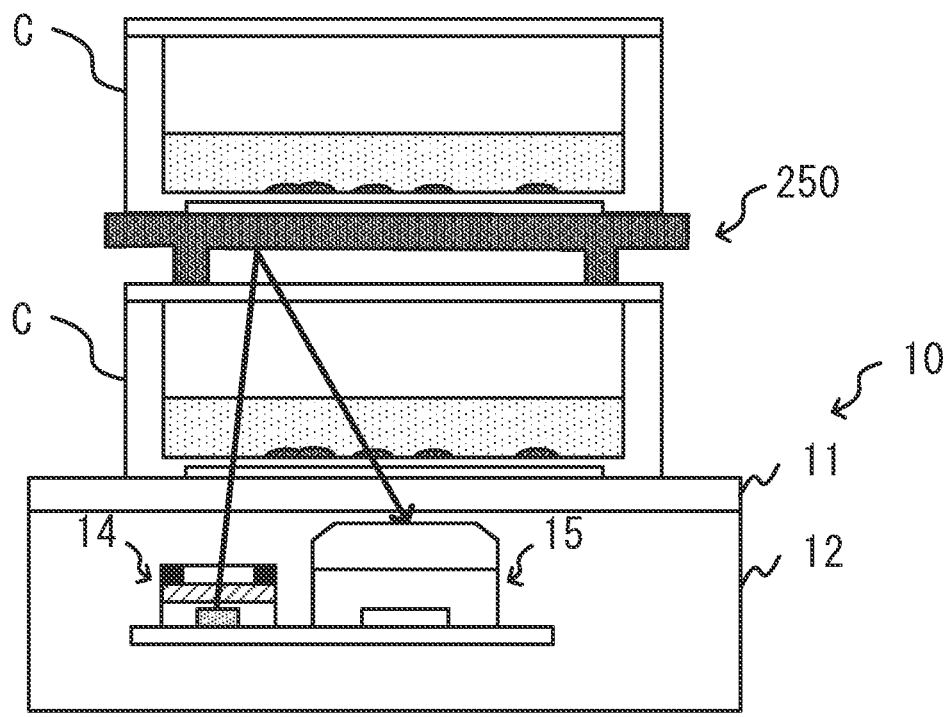
FIG. 23 is a diagram for explaining a method of using an optical deflection unit.

FIG. 23 is a diagram for explaining a method of using an optical deflection unit. The embodiments described above illustrate an example in which the optical deflection unit is included in the observation apparatus, but it is sufficient for the optical deflection unit to be used together with the observation apparatus, and does not have to be a structural element of the observation apparatus. For example, as illustrated in FIG. 23, an optical deflection unit 250 may be an auxiliary instrument that is not part of the observation apparatus 10, but is commercially distributed by itself separately from the observation apparatus 10. The optical deflection unit 250 may also be used by being placed on the top face of the culture container C, and light emitted from the inside of the case 12 to the outside of the case 12 can be guided back inside the case 12 at a desired angle, similarly to the optical deflection units 100 to 230. Note that the optical deflection unit 250 may also be used as an auxiliary instrument used when stacking a plurality of culture containers C.

In this specification, the phrase "on the basis of A" does not mean "on the basis of A only" but rather means "on the basis of at least A", and furthermore also means "on the basis of at least A partially". In other words, "on the basis of A" may also be on the basis of B in addition to A, and may also be on the basis of a portion of A.

In this specification, the term "substantially" means sufficiently close enough to elicit an advantage of the characteristic modified by the term. For example, the phrase "substantially parallel" is not limited to meaning exactly parallel, and means nearly parallel enough to elicit an advantage obtained by being parallel.

In this specification, terms such as "first" and "second" modifying a noun do not limit the quantity or order of the elements expressed by the noun. These terms are merely used to distinguish two or more elements from each other, and do not signify anything further. Consequently, specifying elements as "first" and "second" does not mean that the "first" element precedes the "second" element, and moreover does not preclude the existence of a "third" element.

What is claimed is:

1. An observation apparatus comprising:
a case including a transmissive window;
an image sensor housed in the case;
an optical system housed in the case, the optical system being configured to condense light incident inside the case by transmitting through the transmissive window to form an image of a sample inside a container placed on the transmissive window above the image sensor;
a light source housed in the case, the light source being configured to emit light to an outside of the case without passing through the optical system; and
an optical deflection unit having a surface configured to deflect light emitted from the light source to an outside of the case in a first direction going toward the transmissive window, such that an angle of exit defined as the angle between the first direction and an optical axis of the optical system is different from an angle of incidence defined as the angle between a second direction in which light emitted to the outside of the case is incident on the optical deflection unit, and the optical axis.

2. The observation apparatus according to claim 1, wherein a pencil of light containing light deflected in the first direction by the optical deflection unit and passing through a point on the sample is distributed straddling an outer edge of a pupil of the optical system in a pupil plane of the optical system.

3. The observation apparatus according to claim 2, wherein the angle of exit is larger than the angle of incidence.

4. The observation apparatus according to claim 2, wherein the angle of exit is smaller than the angle of incidence.

5. The observation apparatus according to claim 1, wherein the angle of exit is larger than the angle of incidence.

6. The observation apparatus according to claim 1, wherein the angle of exit is smaller than the angle of incidence.

7. The observation apparatus according to claim 1, wherein the surface of the optical deflection unit comprises at least one reflective surface configured to reflect light incident on the optical deflection unit.

8. The observation apparatus according to claim 7, wherein the at least one reflective surface includes a reflective surface inclined with respect to the optical axis.

9. The observation apparatus according to claim 8, wherein the reflective surface inclined with respect to the optical axis includes a metal thin-film mirror or a dielectric multilayer film mirror formed on a surface of a base material.

10. The observation apparatus according to claim 9, wherein the at least one reflective surface includes a plurality of inclined faces arranged in a direction intersecting the optical axis.

11. The observation apparatus according to claim 8, wherein the at least one reflective surface includes a plurality of inclined faces arranged in a direction intersecting the optical axis.

12. The observation apparatus according to claim 11, wherein the at least one reflective surface is a partially reflective mirror or a splitter configured to reflect a portion of incident light and transmit the rest.

13. The observation apparatus according to claim 7, wherein the optical deflection unit further includes an adjustment unit configured to adjust the angle of the at least one reflective surface with respect to the optical axis.

14. The observation apparatus according to claim 13, wherein
the optical deflection unit further includes a prism plate having a plurality of refractive surfaces arranged in a direction intersecting the optical axis,
each of the plurality of refractive surfaces
is a refractive surface inclined with respect to the optical axis that refracts light incident on the optical deflection unit, and
is provided on an optical path between the at least one reflective surface and the transmissive window.

15. The observation apparatus according to claim 7, wherein
the optical deflection unit further includes at least one refractive surface configured to refract light incident on the optical deflection unit, and
the at least one refractive surface is provided on an optical path between the at least one reflective surface and the transmissive window.

16. The observation apparatus according to claim 7, wherein
the optical deflection unit further includes a prism plate having a plurality of refractive surfaces arranged in a direction intersecting the optical axis,
each of the plurality of refractive surfaces
is a refractive surface inclined with respect to the optical axis that refracts light incident on the optical deflection unit, and
is provided on an optical path between the at least one reflective surface and the transmissive window.

17. The observation apparatus according to claim 16, wherein the at least one reflective surface is a partially reflective mirror or a splitter configured to reflect a portion of incident light and transmit the rest.

18. The observation apparatus according to claim 1, wherein
the optical deflection unit further includes a first face that does not face opposite the transmissive window, and
at least a portion of the first face is a plane parallel to the transmissive window.

19. An image formation method comprising:
emitting light from an inside of a case to an outside of the case;

deflecting, with a surface of an optical deflection unit, the light emitted to the outside of the case to a first direction proceeding toward a transmissive window of the case; and condensing, with an optical system inside the case, light incident inside the case by transmitting through the transmissive window to form an image of a sample inside a container placed on the transmissive window above an image sensor, wherein an angle of exit defined as the angle between the first direction and an optical axis of the optical system is different from an angle of incidence defined as the angle between a second direction in which light emitted to the outside of the case is incident on the optical deflection unit, and the optical axis.

* * * * *